(12) United States Patent
Mabuchi et al.

(10) Patent No.: US 10,398,982 B2
(45) Date of Patent: Sep. 3, 2019

(54) COMPUTER SYSTEM

(71) Applicant: BANDAI NAMCO Entertainment Inc., Tokyo (JP)

(72) Inventors: Yoshihiko Mabuchi, Kawasaki (JP); Shogo Oku, Tokyo (JP); Akinori Wakebe, Nagareyama (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 0 days.

(21) Appl. No.: 15/718,700

(22) Filed: Sep. 28, 2017

(65) Prior Publication Data

US 2018/0093188 A1 Apr. 5, 2018

(30) Foreign Application Priority Data

Sep. 30, 2016 (JP) ................. 2016-193917

(51) Int. Cl.

| | |
|---|---|
| *A63F 13/44* | (2014.01) |
| *A63F 13/69* | (2014.01) |
| *A63F 13/822* | (2014.01) |
| *A63F 13/327* | (2014.01) |
| *A63F 13/55* | (2014.01) |
| *A63F 13/792* | (2014.01) |
| *A63F 13/60* | (2014.01) |
| *A63F 13/35* | (2014.01) |
| *A63F 13/92* | (2014.01) |

(52) U.S. Cl.
CPC ............ *A63F 13/69* (2014.09); *A63F 13/327* (2014.09); *A63F 13/44* (2014.09); *A63F 13/55* (2014.09); *A63F 13/60* (2014.09); *A63F 13/792* (2014.09); *A63F 13/822* (2014.09); *A63F 13/35* (2014.09); *A63F 13/92* (2014.09); *A63F 2300/575* (2013.01)

(58) Field of Classification Search
None
See application file for complete search history.

(56) References Cited

PUBLICATIONS

Clash Royale review, http://www.148apps.com/reviews/clash-royale-review/, Mar. 8, 2016.*
YouTube video "Let's Play Clash Royale Ep. #1: The Basics!", https://www.youtube.com/watch?v=EVMFgEwdCHc&list=PLL0_pgYXAhiic6kt2O81Ok05hM-l22dYk, Jan. 14, 2016.*
YouTube video "Let's Play Clash Royale Ep. #15: New Deck! Barbarian Hut & Hog Rider", https://www.youtube.com/watch?v=1lpz52q-U98&list=PLL0_pgYXAhiic6kt2O81Ok05hM-l22dYk&index=15, Apr. 14, 2016.*
"Clash Royale" (released in Jan. 2016) URL: https://clashroyale.com

* cited by examiner

*Primary Examiner* — Damon J Pierce
(74) *Attorney, Agent, or Firm* — Posz Law Group, PLC

(57) ABSTRACT

A player can use a character and a chest, in possessed game objects, to build a deck, and play a battle game with the character and the chest, used to build the deck, deployed on a game field as units of a gameplay. The chest used in the gameplay has an activation condition (timer period of a time limit lock) and acquisition control (determination of the content of the chest and provision of the content to the player) of the chest 5 changed in accordance with the type of the chest deployed and an action such as an attack by a character in the game field.

20 Claims, 21 Drawing Sheets

COMPUTER SYSTEM

Japanese Patent Application No. 2016-193917 filed on Sep. 30, 2016 is incorporated herein by reference in its entirety.

BACKGROUND

Technical elements of a video game include a technical element for providing an item and a character in the game. For example, a battle game "Clash Royale" (released in January 2016, URL: https://clashroyale.com) for smartphones, developed by Supercell (developer), provides a player with an object such as a chest containing contents, such as an item and a character, to be acquired after satisfying a predetermined requirement. The requirement includes destroying an enemy base. The chest is provided with a timer lock, and can be opened, that is, the content of the chest is acquirable by the player, only after a timer period, set to the timer lock, elapses. A rule of the game enables the player to purchase and use an item to shorten the timer period set to the timer lock. Otherwise, the player basically has nothing to do but wait for the timer lock to be unlocked. As a result, the player's desire to get new items and characters as soon as possible is greatly increased. This makes the player attracted to the game and want to continue playing the game for a long period of time.

The system of the chest in the game "Clash Royale" is great for creating excitement like a child gets from a Christmas present, and anticipation of the players. The player has a limited choice regarding the chest; simply waiting until its open, or consuming a predetermined item to shorten the timer period of the timer lock. In this context, the chest is technically not part of the gameplay.

This also applies to systems, other than the system of the chest in "Clash Royale", which make an object acquirable when an activation condition is satisfied.

SUMMARY

According to one aspect of the invention, there is provided a computer system that executes a game using an object possessed by a player, the computer system comprising:

a processor; and a storage device storing a program, the processor executing the program for providing a medium object to the player, the medium object being associated with a content object in an acquisition suspended state and having at least a timer period set as a condition for transition from the acquisition suspended state to an acquisition enabled state;

causing transition from the acquisition suspended state to the acquisition enabled state in which the content object associated with the medium object is acquirable when the timer period expires;

deploying the medium object on a game field based on input of an operation by the player; and changing the timer period of the medium object deployed on the game field.

DESCRIPTION OF EXEMPLARY EMBODIMENTS

Figure 1:
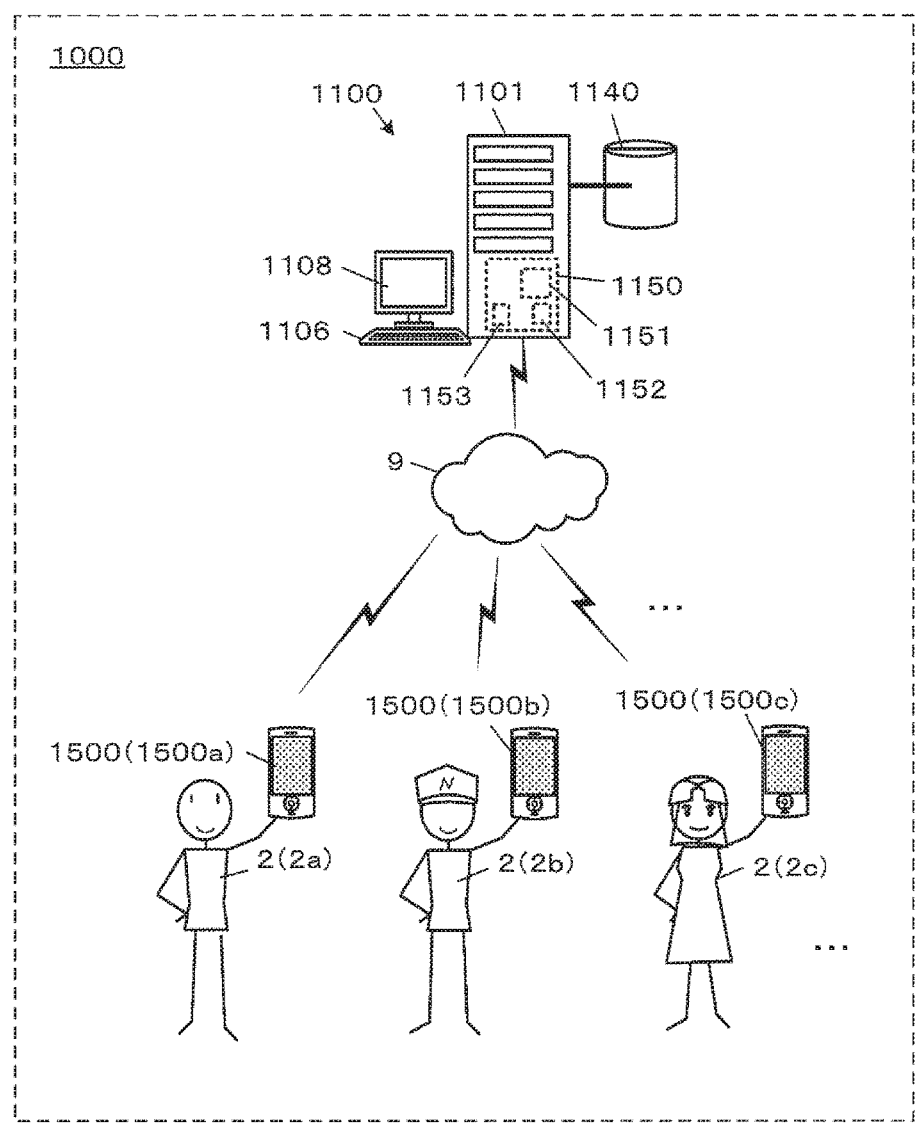
FIG. 1 is a view illustrating an example of the configuration of a game system.

Specific embodiments of the invention may provide a new technique for a system in which an object becomes acquirable when an activation condition is satisfied.

According to one embodiment of the invention, there is provided a computer system that executes a game using an object possessed by a player, the computer system comprising:

a processor; and a storage device storing a program, the processor executing the program for providing a medium object to the player, the medium object being associated with a content object in an acquisition suspended state and having at least a timer period set as a condition for transition from the acquisition suspended state to an acquisition enabled state;

causing transition from the acquisition suspended state to the acquisition enabled state in which the content object associated with the medium object is acquirable when the timer period expires;

deploying the medium object on a game field based on input of an operation by the player; and changing the timer period of the medium object deployed on the game field.

In the computer system,
the timer period may include a remaining period, and
the changing the timer period may include changing the remaining period.

In the computer system,
the timer period may include counting speed, and
the changing the timer period may include changing the counting speed.

According to this configuration, a medium object can be deployed on the game field to be used as unit in a gameplay. The timer period can be changed when the medium object is deployed on the game field. It is a matter of course that a state where a content object associated with the medium object is acquirable by the player is achieved when the timer period elapses and thus the activation condition is satisfied. Thus, a whole new technique can be introduced to a system in which an object becomes acquirable after an activation condition is satisfied.

The computer system may be implemented by a single computer, and may also be implemented with a plurality of computers connected to each other through a communication line in a data exchangeable manner.

In the computer system,
the changing the timer period may include changing, when deploying of the medium object on the game field or a game progression related to the game field is completed, the counting speed to be restored to a counting speed before the deploying on the game field.

According to this configuration, a situation where the timer speed is changed is limited to a period during which the medium object is deployed on the game field or used in the game. Thus, a technique of encouraging the player to more actively deploy the medium object on the game field and use the medium object in the game can be achieved.

In the computer system,
the changing the timer period may include changing the timer period so that the timer period is able to elapse quicker in a case where the medium object is deployed on the game field, than in a case where the medium object is not deployed.

According to this configuration, the medium object deployed in the game field can more quickly transition to the acquisition enabled state. Thus, a technique of achieving a higher advantage of deploying the medium object on the game field to encourage the use of the medium object in the game can be achieved.

In the computer system,
the changing the timer period may include changing the timer period in accordance with a deployed position of the medium object.

According to this configuration, a technique of setting different timer periods depending on the deployed location of the medium object on the game field can be achieved.

In the computer system,
the processor may execute the program for further notifying the player of the timer period.

According to this configuration, a technique of notifying the player of a change in the timer period can be achieved.

In the computer system,
the changing the timer period may include changing the timer period when the medium object is deployed within an area of influence of an action performed by a character on the game field.

In the computer system,
the timer period may include a remaining period, and
the changing the timer period may include changing the remaining period.

As used herein, a case where "the medium object is deployed within a certain area of influence of an action performed by the character" corresponds to a case where the medium object receives an attack by the character within an attack area as the area of influence. Note that the area of influence as well as the detail of the action can be set as appropriate.

According to this configuration, a technique of changing the timer period in accordance with an occurrence of an event where a medium object deployed on the game field is affected in some ways by a character also deployed on the game field can be achieved.

In the computer system,
the processor may execute the program for further notifying the player of the timer period.

According to this configuration, the player can be notified of a change in the remaining timer period, and thus a player friendly game can be achieved.

In the computer system,
the processor may execute the program for further causing to acquire the content object which is associated with the medium object on a first come first served basis by a player who makes an acquisition operation while a game is in process, when the medium object deployed on the game field transitions to the acquisition enabled state.

According to this configuration, a rule that the ownership of a medium object deployed on the game field is transferred from the original owner to another owner can be set. In other words, the ownership of the medium object deployed on the game field can be transferred when a game progression status satisfies a predetermined ownership transfer condition.

In the computer system,
the game may be a battle game in which the medium object has no attacking ability,
the processor may execute the program for further:
building a deck as a combination of a predetermined number of objects to be in the game, selected from objects including a character object and the medium object possessed by the player, based on input of an operation by the player; and
controlling a game progression involving a battle of the objects, in the deck, appearing in the game, and
the deploying may include deploying, when the medium object is in the deck, the medium object, in the deck, on the game field, based on input of an operation of the player.

According to this configuration, a game employing a deck system can be achieved in which objects to be used in the game are selected in advance before the game starts. The system makes the user contemplate whether or not to partially consume the limited capacity of the deck by determining to use a medium object as a unit, to change the activation condition of the medium object. Thus, a technique of further increasing the fun of the game using medium objects can be achieved.

First Embodiment

Next, an example according to a first embodiment is described. Specifically, the example relates to an online battle game involving a game object (medium object) to which an activation condition and acquisition control are set. The acquisition control relates to acquisition of the content object by a player after the activation condition has been satisfied. Note that modes to which the present invention can be applied are not limited to the embodiments described below.

The "activation condition" is a condition required to be satisfied for the player possessing/owning a game object, to which the condition has been set, to execute the acquisition control associated with the game object. Thus, for the players, the condition is for achieving a state where the content of a chest is acquirable. The details of the condition can be defined with a range and a threshold vale of parameters indicating a game progression status.

The activation condition according to the present embodiment is based on the elapse of time. Other conditions may also be set as appropriate in accordance with game detailed settings. For example, a level of the player or a player character, the number of game stages to be finished, a certain item or a certain character that needs to be possessed, or the like may be used to define the activation condition. Note that the activation condition may be one or a combination of a plurality of the parameters including the elapse of time.

The "acquisition control" is control performed so that the player can acquire the content object associated with the game object (medium object), after the activation condition has been satisfied.

In the present embodiment, objects such as an item and a character are referred to as a content object, and a "chest" may be an example of the game object (medium object) that outputs the content objects and rewards to be acquirable. Thus, the activation condition according to the present embodiment is a condition for transition from an acquisition suspended state, in which the chest cannot be opened to acquire the content/reward therein, to an acquisition enabled state acquisition where the content/reward can be acquired. Thus, the activation condition may also be referred to as an opening condition. The acquisition control according to the present embodiment is for the player to acquire the content of the chest. More specifically, this may also be regarded as selecting an object output from the chest.

Note that the form of the medium object in a game is not limited to the chest, and may be set as appropriate in accordance with the details of the game. For example, the medium object may have a form of an "egg" with the activation condition being a hatching condition and the acquisition control being provision of a familiar to be born (content object) to the player. The medium object may be an "a skill book" or the "skill" itself with the activation condition being a level of a player character required for mastering the new skill, and the acquisition control being the provision of the new skill to the player character. Furthermore, the medium object may be a "new weapon", "newly created item", "spell book", "magical item", or the like, with the activation condition being the elapse of time and acquisition of a material for completing the development or activation, and the acquisition control being the provision of the content object to the player or the activation of the content object.

[Hardware Configuration]

First of all, an example of a hardware configuration according to the present embodiment is described FIG. 1 is a view illustrating an example of the configuration of a game system according to the present embodiment. A game system 1000 according to the present embodiment is a computer system including a server system 1100 that can connect to a communication line 9 so that bidirectional data communications can be performed, and one or a plurality of user terminals 1500 (1500a, 1500b, . . . ).

The communication line 9 is a data communication channel. Specifically, the concept of the communication line 9 includes: a communication network such as a local area network (LAN) using a private line (private cable) for direct connection, Ethernet (registered trademark), and the like; a telecommunication network; a cable network; and the Internet. The communication method may be a cable communication method or a wireless communication method.

The server system 1100 is a computer system including: a main body device 1101 including a control board 1150; a keyboard 1106; a touch panel 1108; and a storage 1140.

The control board 1150 includes a microprocessor of various types (e.g., a central processing unit (CPU) 1151, a graphics processing unit (GPU), and a digital signal processor (DSP)), an IC memory 1152 of various types (e.g., VRAM, RAM, and ROM), and a communication device 1153. The control board 1150 may partially or entirely be implemented with an application specific integrated circuit (ASIC), a field-programmable gate array (FPGA), and a System on a Chip (SoC).

Through a calculation process performed by the control board 1150 based on a predetermined program and data, the server system 1100 implements: 1) a user management function related to user registration and the like; 2) a game management function of providing data required for a player 2 (2a, 2b, . . . ) who plays the game with the user terminal 1500 (1500a, 1500b, . . . ), to manage execution control on the game played with the user terminal 1500 (1500a, 1500b, . . . ); and 3) an online shopping function of selling various items, usable in the game, to the user online. Thus, the game according to the present embodiment is implemented as one type of client-server online game.

The server system 1100 is illustrated/described as a single server. Alternatively, a plurality of blade servers, cooperating to implement the functions, may be installed while being connected to each other via an internal bus to be capable of performing data communications with each other. Furthermore, a plurality of independent servers, disposed in locations distant from each other, may perform data communications with each other via the communication line 9 to function as the server system 1100 as a whole.

The user terminal 1500 (1500a, 1500b, . . . ) is a computer system, individually usable by the player 2 (2a, 2b, . . . ) to play the game, and is an electronic device that can access the server system 1100 through the communication line 9 to implement an online game. The user terminal 1500 is a device known as a smartphone. The user terminal 1500 may also be a portable game device, a game controller, a personal computer, a tablet computer, a wearable computer, an arcade game device, or the like.

Figure 2:
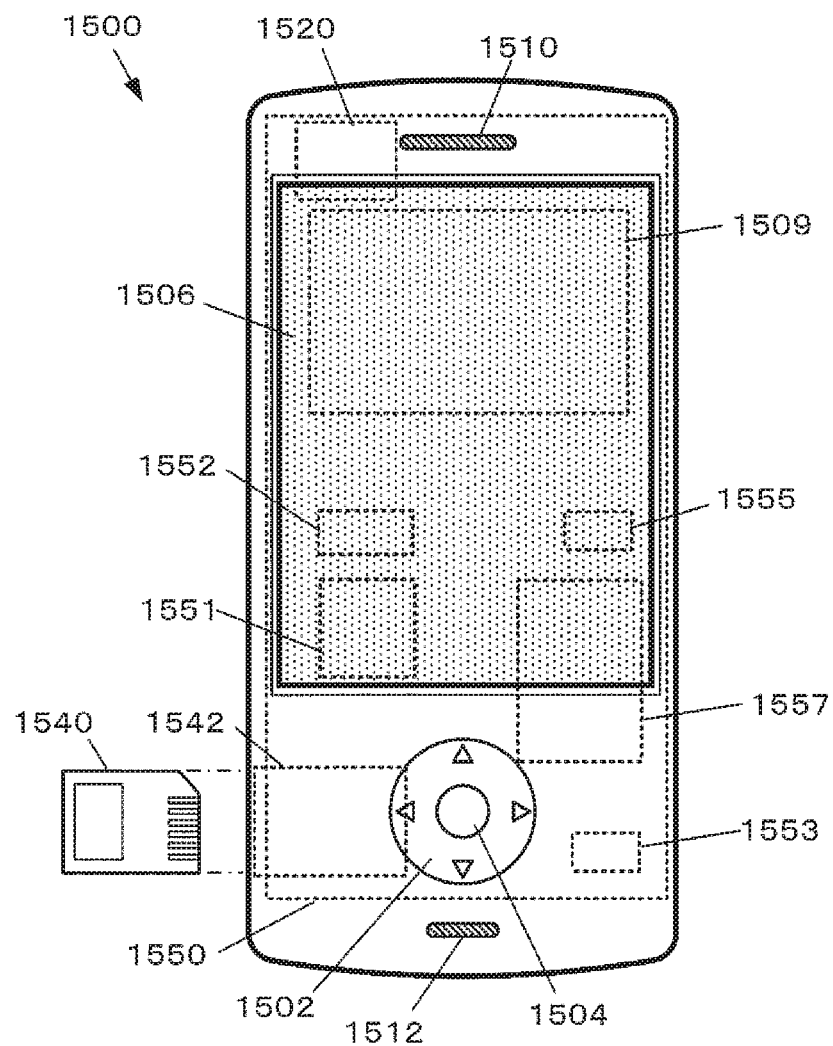
FIG. 2 is a front view illustrating an example of the configuration of a user terminal.

FIG. 2 is a front view illustrating an example of the configuration of the user terminal 1500 according to the present embodiment.

The user terminal 1500 includes: an arrow key 1502; a switch button 1504; a touch panel 1506 that functions as an image display device and a touch position input device; a speaker 1510; a built-in battery 1509; a microphone 1512; a control board 1550; and a memory card reader 1542 that can write and read data to and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data to and from an IC card as a credit card or prepaid card usable for payment involved in playing the game or the like.

The control board 1550 includes: a microprocessor of various types (e.g., a CPU 1551, a GPU, and a DSP); an IC memory 1552 of various types (e.g., a VRAM, a RAM, and a ROM); a wireless communication module 1553 for performing wireless communications with a mobile phone base station, a wireless LAN base station, or the like connected to the communication line 9; a position measurement module 1555; an interface circuit 1557; and the like.

The position measurement module 1555 can receive a signal provided from the position measurement system, and can output position measurement information at a predetermined interval (for example, once a second). The position measurement system according to the present embodiment is a Global Positioning System (GPS). Thus, the position measurement module 1555 may be a known "GPS module", a "GPS receiver", or the like. The "position measurement information" includes measurement date and time (Coordinated Universal Time (UTC)), position coordinates (latitude longitude/altitude), and the like. The position coordinates can be obtained by the position measurement module 1555 to be used as a "player position" thereafter.

The system used for the position measurement is not limited to the GPS, and may be other satellite navigation systems such as Galileo. A position measurement system using a wireless LAN, a base station for smartphones, and the like may be employed. The positional measurement may be performed as an operation of determining an object to be within a communication range of a host station by receiving a signal from the host station for wireless communications.

The interface circuit 1557 includes circuits such as: a driver circuit that drives the touch panel 1506; a circuit that receives signals from the arrow key 1502 and the switch button 1504; an output amplifier circuit that outputs a sound signal to the speaker 1510; an input signal generation circuit that generates a signal corresponding to the sound collected by the microphone 1512; and a signal input-output circuit that inputs and outputs a signal to and from the memory card reader 1542.

The elements mounted on the control board 1550 are electrically connected with each other through a bus circuit or the like to be capable of exchanging data and signals. The control board 1550 may partially or entirely be implemented with an ASIC, an FPGA, or a SoC. The control board 1550 stores a program and various types of data, for implementing a function as a user terminal of the game according to the present embodiment, in the IC memory 1552.

The client program and various types of setting data are downloaded by the user terminal 1500 from the server system 1100 in the present embodiment. The program and the data may also be read from a storage medium such as the memory card 1540 additionally provided.

[Details of Game]

Next, details of the game according to the present embodiment are described.

The game according to the present embodiment is a battle game. More specifically, the player 2, as a registered user, selects a predetermined number of possessed game objects, and deploys the selected objects on a game field as units.

Figure 3:
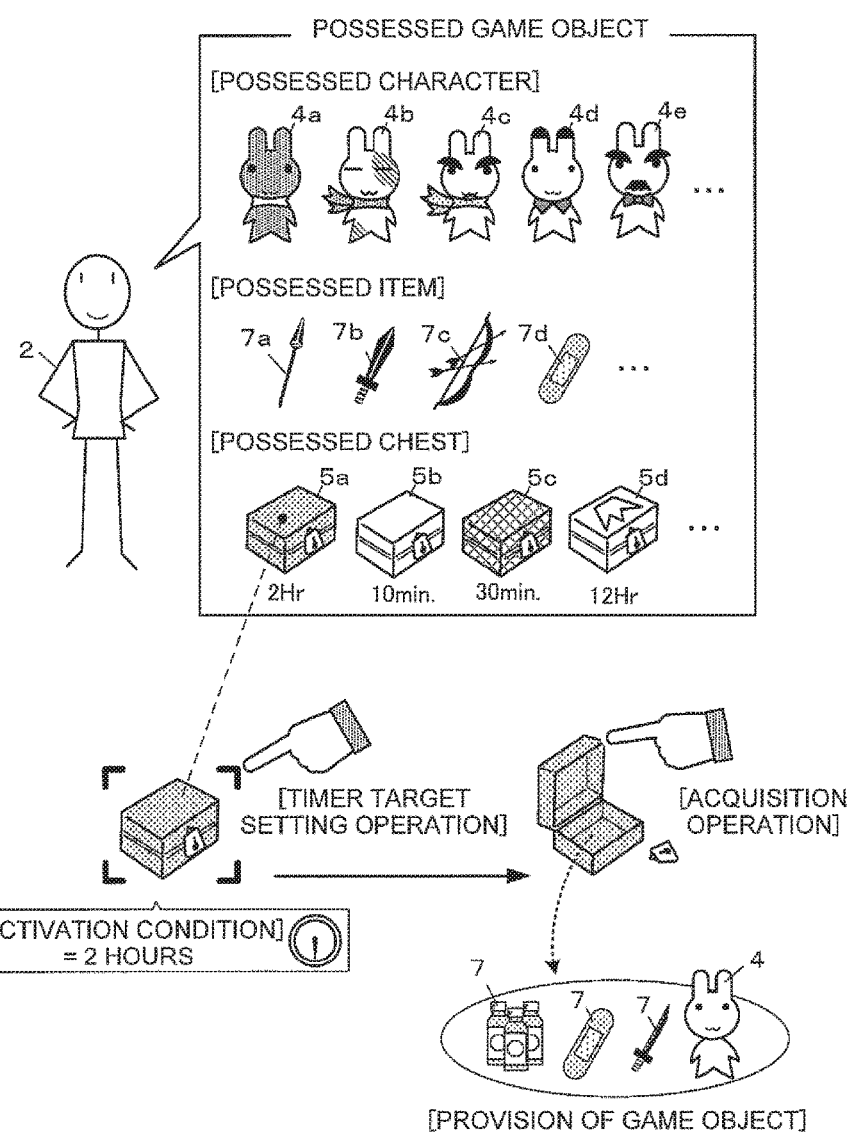
FIG. 3 is a view illustrating a game object that can be possessed by a player and can be used as a unit in a game.

FIG. 3 is a view illustrating game objects that can be possessed by the player 2 and can be used as the units in the game. The game objects according to the present embodiment include a character 4 (4a, 4b, . . . ), a chest 5 (5a, 5b, . . . ), and an item 7 (7a, 7b, . . . ). Note that the game object may include other types of data including familiars and rides.

A plurality of types of characters set to have different abilities are prepared as the character 4. The player 2 can obtain a new character 4 through online purchasing or through the gameplay (as a reward or a content output from the chest 5 as described later in the present embodiment, for example).

The chest 5 according to the present embodiment is a medium object to which an activation condition and acquisition control are set, and is set to be a locked box containing a reward as a content object such as an item, in the game world. The chest may be appropriately designed to have an outer appearance of a box, a case, a bag, a pot, a storage, an egg, a cocoon, or the like. A plurality of types of the chest 5 with different activation conditions and details of the acquisition control are prepared. The chest 5 is provided to the player 2 when the game progression status satisfies a predetermined provision condition.

The activation condition of the chest 5 according to the present embodiment is a set period of a timer (timer period) for a timer lock. When the chest 5 is set as a timer target through an operation of the player 2, a remaining timer period starts to decrease in accordance with an actual elapse of time. The activation condition is regarded as being satisfied when the timer period decreases to "0". The number of the chests 5 that can be set as the timer target is limited in the present embodiment, but can also be unlimited.

The chest 5 with the activation condition satisfied transitions from a state where the content cannot be acquired (acquisition suspended state) to a state where the content can be acquired any time (acquisition enabled state).

The type of the reward can be set as appropriate. Examples of the reward include: an item used by the character 4; an item making the activation condition easier to satisfy; a new character 4; and an item, a game point, and a coupon serving as an exchangeable currency that can be exchanged with various rewards related to the game.

A reward output from the chest 5 has a rarity set as information on a group to which the reward pertains. A reward with a higher rarity is more useful and thus can be more advantageous while playing the game.

The chest 5 with an activation condition that is more difficult to satisfy (in the present embodiment, a longer timer period until the chest can be opened) is set to be likely to output a larger number of rewards with higher rarities. In other words, the chest 5 with a more valuable content is more difficult to open.

Figure 4:
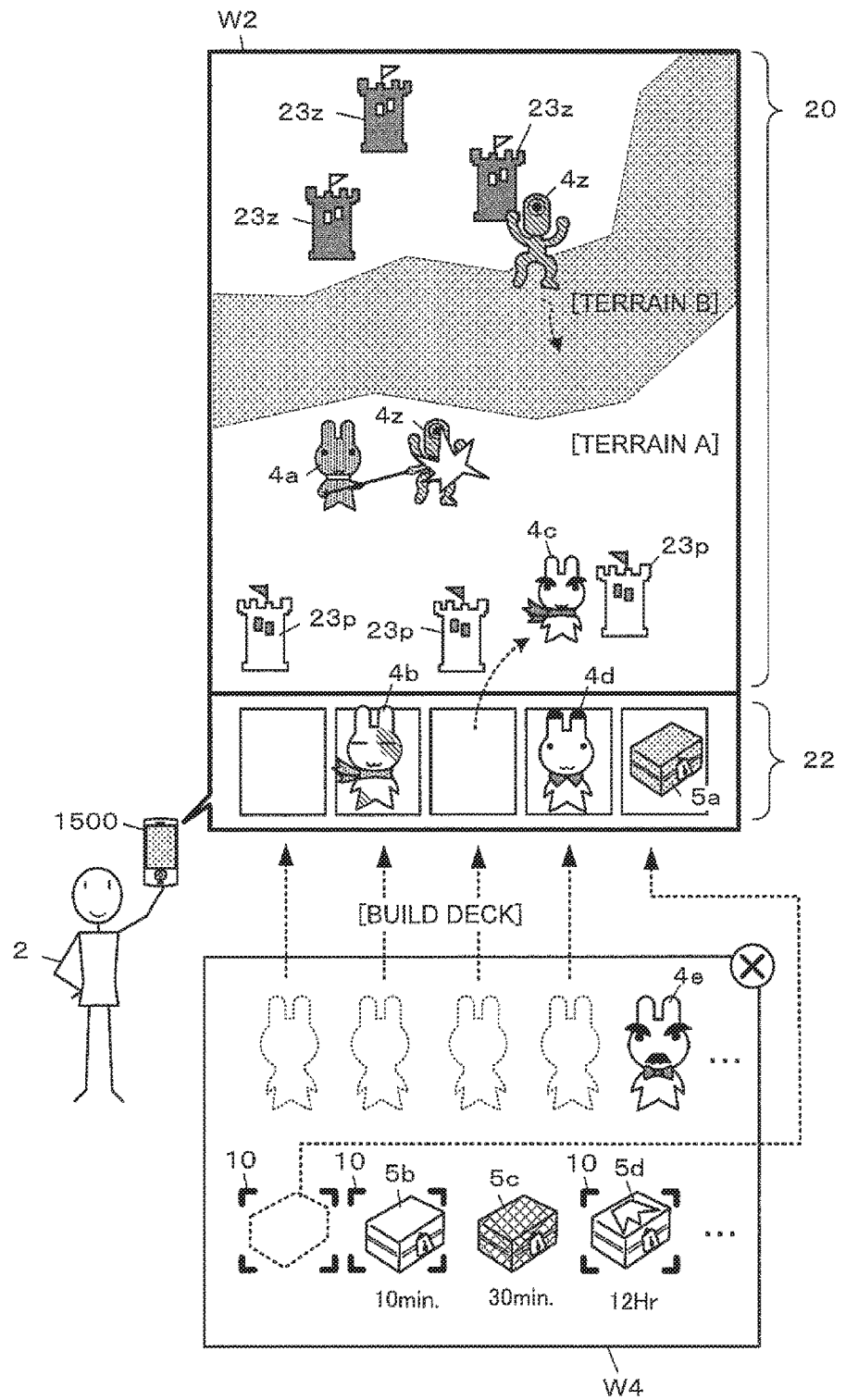
FIG. 4 is a view illustrating details of the game.

FIG. 4 is a view illustrating details of the game.

The player 2 selects a predetermined number of objects from the possessed game objects to build a group of selected objects, and plays the game while watching a game screen W2 displayed on the touch panel 1506 of the user terminal 1500. The group of selected objects is referred to as a "deck". The deck according to the present embodiment is built of the characters 4 and the chests 5 set as the timer targets.

The player 2 performs an operation of building the deck before the game starts. For example, a predetermined deck building start operation may be performed on the game screen W2 or a predetermined menu screen to call a possessed game object list screen W4.

The possessed game object list screen W4 is a list of objects that can be used as units in the game. In the present embodiment, a list of the possessed characters 4 and chests 5 are displayed to be selectable. The chests 5 (chests 5a, 5b, and 5d in the example illustrated in FIG. 4) set as the timer targets are each displayed together with a timer target designation marker 10 indicating that the corresponding chest is usable for building the deck.

The player 2 performs an operation of dragging and dropping a desired object from the possessed game object list screen W4 to a deck display section 22 of the game screen W2 to build a deck. In the present embodiment, only five setting frames are displayed in the deck display section 22, but the number of setting frames can be set as appropriate. How the deck building operation is performed is not limited to that described above, and thus can be set as appropriate.

The game screen W2 displays a game field 20 and the deck display section 22.

The game field 20 includes: a screen lower side as a territory of the player (player territory) including bases 23p of the player; and a screen upper side as a territory of the opponent including enemy bases 23z.

Terrains are set in the game field 20. A game object in a certain location is affected in various ways in accordance with the type of the terrain set to the location. For example, the ability of the character 4 of a certain type is improved or lowered in accordance with the terrain. In the present embodiment, the terrain affects the activation condition of the chest 5 and the details of the acquisition control (described in detail later). FIG. 4 illustrates an example where a shaded area and a non-shaded area are set to have different terrains in the game field 20.

The player 2 can drag and drop a game object (an object as the character 4 or the chest 5), displayed on the deck display section 22, to a position within a movable range, set in advance to each object type, from the base 23p of the player, so that the game object can be used as a unit in the game field 20.

The character 4 deployed on the game field 20 behaves under automatic control to attack an enemy character 4z or the enemy base 23z in accordance with a behavior pattern set to the character in advance.

Each character 4 and base 23 (23z and 23p) has a hit point set thereto that decreases upon receiving an attack. The object is defeated or destroyed when the hit point decreases to "0". The defeated character 4 returns to the deck display section 22 but cannot be deployed again for a certain period of time as a penalty. The bases 23 and 24 that have been destroyed cannot be restored.

The game ends when all the bases 23 or 24 on one of the sides are destroyed, or a predetermined time elapses after the player starts playing the game.

Figure 5:
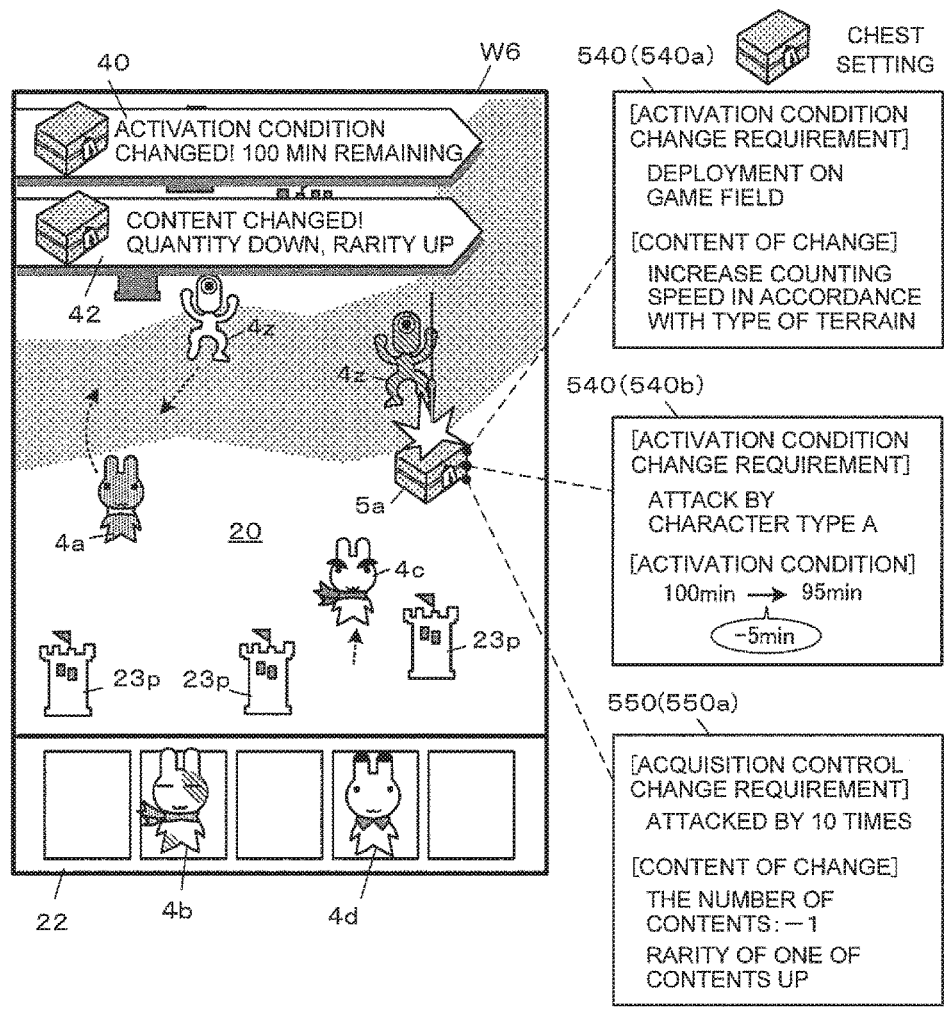
FIG. 5 is a view illustrating changes in an activation condition and details of acquisition control related to a chest deployed on a game field.

FIG. 5 is a view illustrating changes in the activation condition and the details of the acquisition control related to the chest 5 deployed on the game field 20.

Not only the character 4 set in the deck but also the chest 5 set in the deck may be deployed on the game field 20. The chest 5 has no attacking ability. The hit point, set to the character 4 and the base 23, is not set to the chest 5. Thus, the chest 5 strategically functions as a defense wall that would not be destroyed by an enemy. A game rule may be set in such a manner that the chest 5 is unmovable after being deployed, or that the deployed position of the chest 5 is changeable within a predetermined distance range once in every period of time or during a player's turn when the game has a turn system.

In any of the situations, the activation condition and the details of the acquisition control of the chest 5 deployed on the game field 20 change. Specifically, various activation condition change patterns 540 and acquisition control change patterns 550, related to the progress of the game, are set to different types of the chest 5. When the conditions are satisfied as the game progresses, the activation condition and the acquisition control change.

The activation condition change pattern 540 (an activation condition change pattern 540a in FIG. 5) in the example illustrated in FIG. 5 is set to be satisfied so that the activation condition changes, when the chest 5a is deployed on the game field 20. Specifically, the counting speed of the timer for the chest increases depending on the type of the terrain of the location where the chest is deployed. The activation condition according to the present embodiment is based on the elapse of time. Thus, the satisfaction of the pattern described above results in the activation condition temporarily changed to be easier to satisfy (easier for the player), so that the acquisition enabled state can be more easily achieved.

Furthermore, another activation condition change pattern 540 (an activation condition change pattern 540b in FIG. 5), with a requirement based on the attack by the enemy character 4z, is prepared for the chest 5a Specifically, the remaining timer period decreases each time the chest 5a is attacked.

The activation condition change pattern 540 may be set in such a manner that the change in the activation condition may be a combination of the increase in the counting speed and the reduction of the remaining timer period.

Furthermore, as the acquisition control change pattern 550 set for the chest 5a, a pattern (an acquisition control change pattern 550a in FIG. 5) based on an attack by the enemy character 4z is prepared. Specifically, the number of rewards obtained (i.e., the contents of the chest) is decremented by one and the rarity of one of the remaining rewards increases, every time the chest is attacked by predetermined number of times.

Each time the activation condition and the acquisition control of the chest 5 that has been deployed change, an activation condition change notification 40 and/or an acquisition control change notification 42 is temporarily displayed in a game screen W6.

Thus, in the present embodiment, the player 2 can not only set a limited number of the timer target designation markers 10 to the chests 5 so that the possessed chests 5 can be designated as the timer target, and simply wait for the elapse of time, but can also use the chest serving as a unit in the game being played. The chest, serving as the unit, can have its activation condition reduced or more easily satisfied, and have the details of the acquisition control changed to be more advantageous for the player.

The chest 5 used as the unit is advantageous for the player as described above, but also involves a risk.

Figure 6:
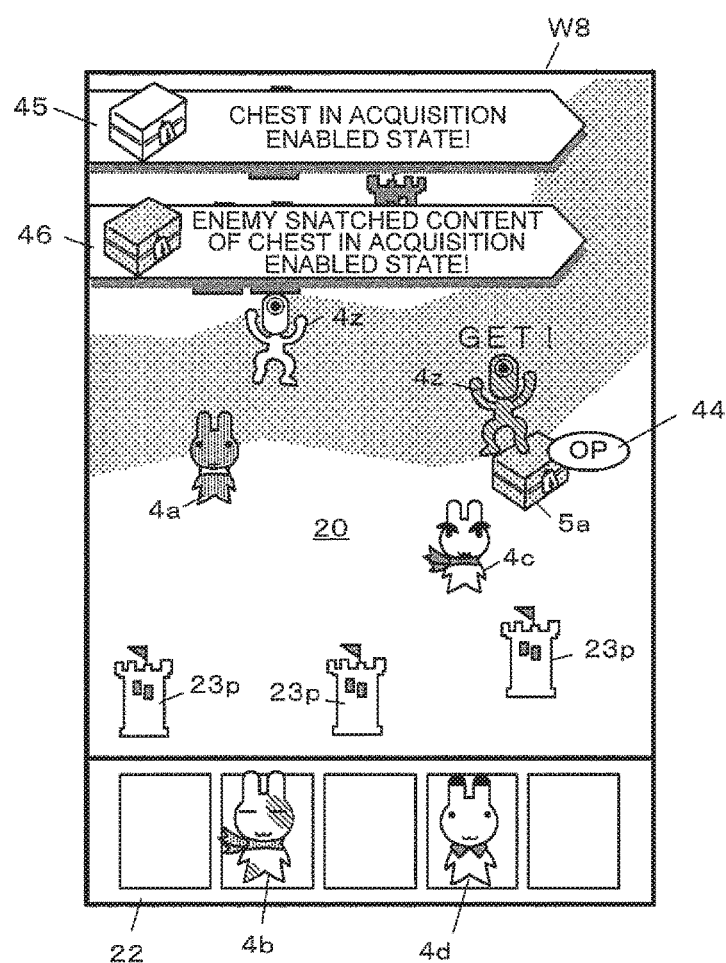
FIG. 6 is a view illustrating a rule on ownership transfer related to a chest deployed on the game field.

FIG. 6 is a view illustrating a rule on ownership transfer related to the chest 5 deployed on the game field 20. The ownership of the chest 5 deployed on the game field 20 is not limited to the player who has deployed the chest 5, and might be transferred when a predetermined ownership transfer condition is satisfied as the game progresses.

Specifically, when the activation condition is satisfied for any of the chests 5 that have been deployed on the game field 20, activation enabled notification 44 indicating that the acquisition enabled state is achieved is displayed on that chest 5. When the activation condition is satisfied for the chest 5 not used for building the deck but is set as the timer target, an activation enabled message 45, different from the activation enabled notification 44, is displayed on a game screen W8.

Then, when a predetermined event occurs after the activation condition has been satisfied, the ownership is transferred.

In the present embodiment, the ownership of a chest 4 is transferred to a player of the character 4 that has made a first contact or an attack on the chest 4, after the activation condition has been satisfied. In an example illustrated in FIG. 6, the enemy character 4z has made the first contact on the chest 5a. As a result, the chest 5a disappears from the game field 20, with the ownership of the chest 5a transferred to the player of the enemy character 4z. The target of the transfer is not limited to the chest 5 as a whole and may be an individual content of the chest 5. When the ownership transfer occurs, an ownership transfer notification 46 indicating the transfer is displayed on the game screen W8.

Thus, the ownership transfer can be regarded as an event, occurring while the game is in process, in which after the acquisition enabled state of the chest 5 (medium object) deployed on the game field 20 has been achieved, rewards associated with the chest (content object) are sequentially acquired by players that have made a predetermined action for acquisition. In other words, rewards are given to players in order of first-come-first-served basis.

As described above, the players using the chest 5 as the unit in the gameplay can enjoy advantages that the content can be more quickly acquired and that the content can be changed, but also has a risk that the content of the chest with the activation condition relaxed and satisfied might be snatched by the other player.

For example, there might be the chest 5 desired to be opened by the player as quickly as possible. Such a chest 5 may be remained closed with the activation condition failed to be satisfied, with the remaining timer period almost being expired, before the battle to be conducted ends. The chest 5 may also be snatched by an enemy after the remaining period has decreased to "0". Which of the events occurs depends on the progress of the game, largely affected by the skill and the deck built by the opponent. Thus, the player has to think about these aspects as well as the ability of the chest 5 as a defense wall, which is challenging and also part of the fun of the game.

The activation condition and the acquisition control according to the present embodiment may also be changed through power-up fusion of the chest 5.

Figure 7:
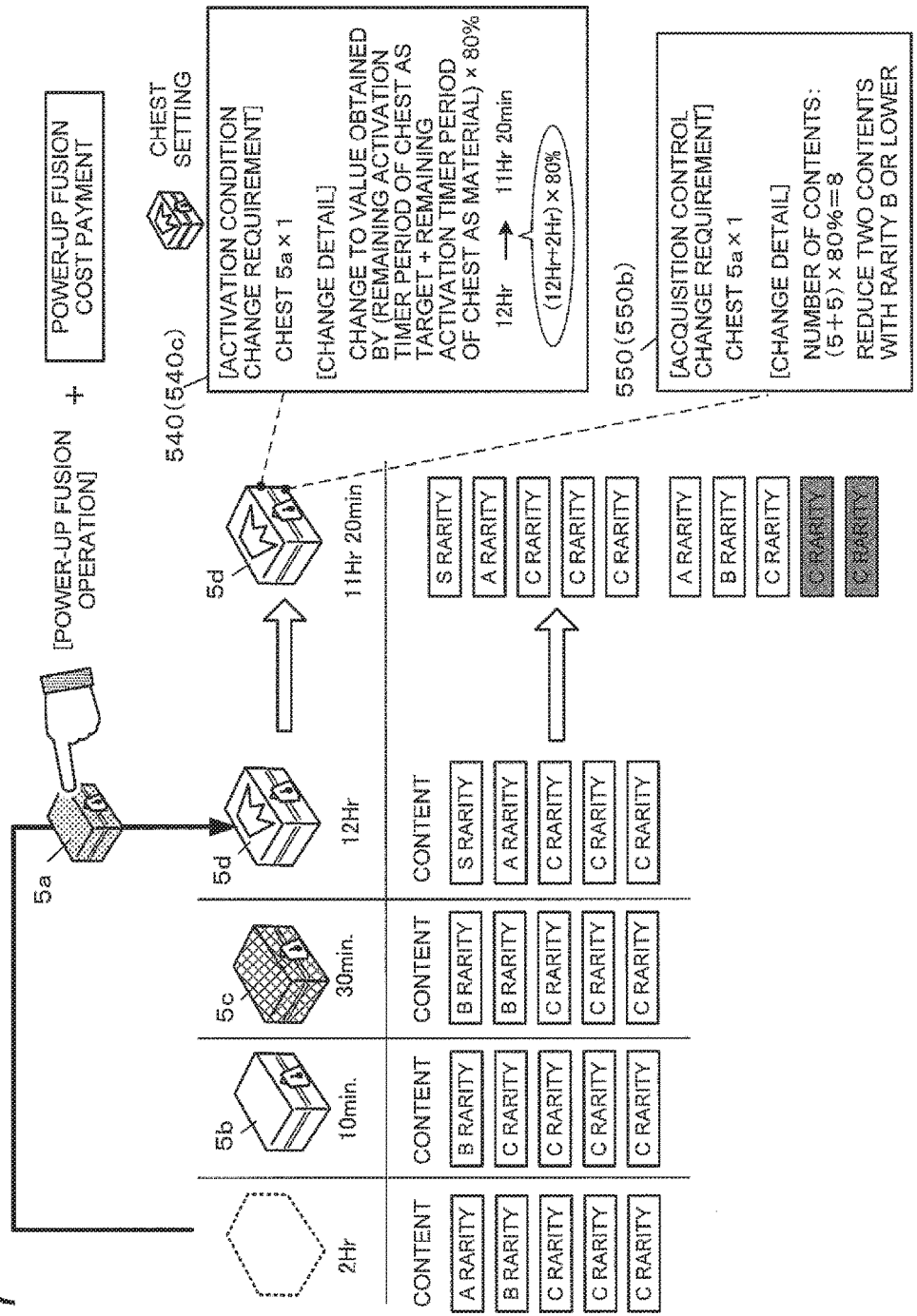
FIG. 7 is a view illustrating power-up fusion of chests.

FIG. 7 is a view illustrating the power-up fusion of the chest 5.

The power-up fusion is performed for powering up a game object serving as a target by consuming an object serving as a material. In the present embodiment, the chest 5 is used as the object serving as the material and the target, and the activation condition and the acquisition control are power up targets.

Specifically, a parameter related to the acquisition control and the activation condition (the set values of the timer) is determined for each type of the chest 5 according to the present embodiment. The parameter includes the number of rewards provided to the player 2 and the rarities of the rewards. When the chest 5 serving as the target is powered up, the activation condition changes to be more easily satisfied, the number of rewards increase, or the rarities set to the rewards change to be more advantageous to the player.

FIG. 7 illustrates an example where the power-up fusion is performed with the chest 5d and chest 5a, of the chests 5 (5a, 5b, . . . ) with different activation conditions, respectively serving as the target (fusion target medium object) and as the material (material medium object).

When the player 2 performs a predetermined power-up fusion operation and pays a predetermined fusion execution cost, the activation condition and the details of the acquisition control of the chest 5a are partially or entirely absorbed in/fused with the chest 5d serving as the target, whereby the chest 5d serving as the target is powered up.

Specifically, the activation condition change pattern 540 (540c), including a parameter related to the power-up fusion as a requirement, is set in advance to the chest 5d serving as the target. After the power-up fusion, the activation condition (activation timer remaining period) of the chest 5d is changed to a value obtained by multiplying a sum of the activation timer period of the chest 5d serving as the target and the activation timer remaining period of the chest 5a serving as the material by a predetermined decreasing rate (80%). Thus, the activation condition of the chest 5d changes to be easier to be satisfied, as a result of the power-up fusion. The decreasing rate can be set to be an appropriate value.

An acquisition control change pattern 550 (550b), changed based on the contents of the chest 5a serving as the material and the chest 5d serving as the target, is set in advance for the detail of the acquisition control. Specifically, the number of the rewards in the chest 5d after the power-up fusion is set by multiplying a sum of the number of rewards to be output from the chest 5a and the number of rewards output from the chest 5d by a predetermined decreasing rate. The rarities are set to the rewards after the fusion in such a manner that the number of rewards with the highest rarities does not decrease from that in the chest 5d, serving as the target, before the fusion.

Thus, in the present embodiment, the player 2 can execute the power-up fusion so that the activation condition becomes easier to satisfy and the detail of the acquisition control can be changed to be more advantageous for the player, rather than simply waiting for the time to elapse after designating the possessing chest 5 as the timer target. Thus, the game can have new attractions added.

[Functional Configuration]

Figure 8:
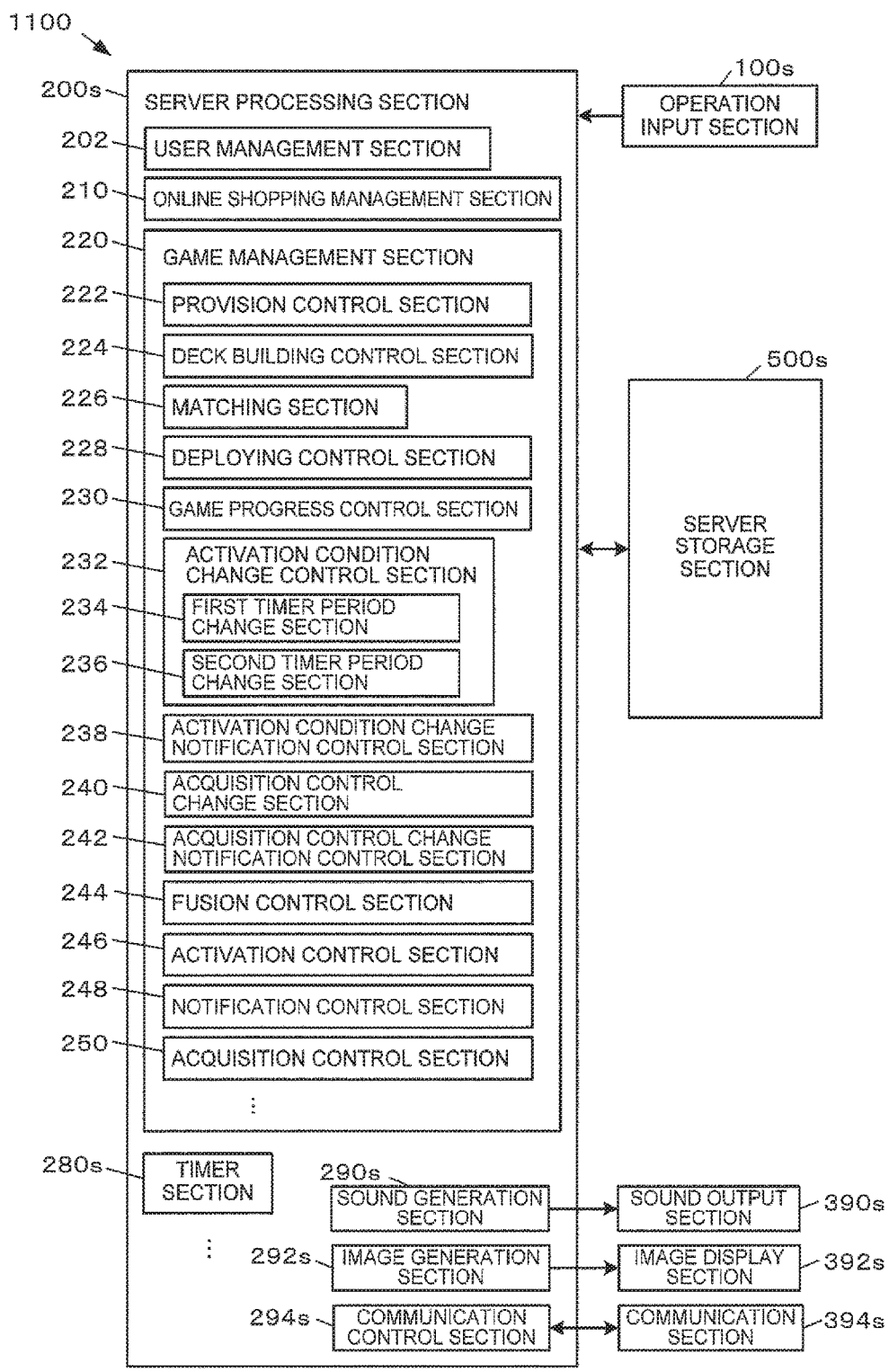
FIG. 8 is a functional block diagram illustrating an example of a functional configuration of a server system according to a first embodiment.

FIG. 8 is a functional block diagram illustrating an example of the functional configuration of the server system 1100 according to the preset embodiment. The server system 1100 according the present embodiment includes an operation input section 100s, a server processing section 200s, a sound output section 390s, an image display section 392s, a communication section 394s, and a server storage section 500s.

The operation input section 100s is used for inputting various operations for managing a server, and corresponds to the keyboard 1106 in FIG. 1.

The server processing section 200s is implemented by electronic parts such as a microprocessor (e.g., a CPU and a GPU), an ASIC, and an IC memory, and controls output and reception of data to and from functional sections including the operation input section 100s and the server storage section 500s. The server processing section 200s executes various calculation processes based on a predetermined program and data, an operation input signal from the operation input section 100s, and data received from the user terminal 1500 to perform overall control on operations performed by the server system 1100.

The server processing section 200s according to the present embodiment includes a user management section 202, an online shopping management section 210, a game management section 220, a timer section 280s, a sound generation section 290s, an image generation section 292s, and a communication control section 294s. Note that the server processing section 200s may further include other functional sections as appropriate.

The user management section 202 executes processing related to a user registration process and stores and manages data associated with an account (user ID). In the present embodiment, the following functions are provided: 1)

account provision with which provision of an account to a registered user is controlled; 2) registered information management with which personal information is registered and managed for each account; 3) possessed currency management with which possessed currency is managed while being associated with an account; and 4) play history management with which login/logout history is managed. Note that other functions for managing data associated with an account can be employed as appropriate.

The online shopping management section 210 is in charge of control related to online shopping as one of billing elements, and may appropriately employ known techniques related to online shopping.

The game management section 220 executes various types of processes related to management of execution of a game. The game according to the present embodiment is a client-server online game. Thus, the game management section 220 according to the present embodiment performs control of providing data required for the gameplay while communicating with the user terminal 1500.

Specifically, the game management section 220 includes a provision control section 222, a deck building control section 224, a matching section 226, a deploying control section 228, a game progress control section 230, an activation condition change control section 232, an activation condition change notification control section 238, an acquisition control change section 240, an issue control change notification control section 242, a fusion control section 244, an activation control section 246, a notification control section 248, and an acquisition control section 250.

The provision control section 222 performs control of providing a medium object, associated with a content object in an acquisition suspended state to be unable to be acquired by the user, to the player. Specifically, the medium object having at least the timer period set as a condition for a transition from the acquisition suspended state to the acquisition enabled state is provided to the player.

In the present embodiment, this corresponds to control of providing the chest 5 (medium object) outputting a reward as a content object such as the character 4 and the item 7, with the activation timer remaining period set as the activation condition, when a predetermined provision condition is satisfied.

The deck building control section 224 performs control for building a deck as a combination of a predetermined number of objects to be in the game, selected from the game object possessed by the player based on an input operation by the player.

The matching section 226 performs matching for users looking for a match.

The deploying control section 228 performs control for deploying a medium object on the game field 20. The player 2 can deploy the chest 5 (medium object) that has been selected to be in the game objects in the built deck based on the input operation by the player 2, on the game field 20.

The game progress control section 230 performs control related to progress of the game involving the object in the built deck. In the present embodiment, the progress of the game is controlled with actions of the characters 4 on both sides in a battle, determined with the matching, automatically controlled.

The activation condition change control section 232 changes the activation condition of a medium object (the chest 5 according to the present embodiment) used in the game, based on a game progression status. In the present embodiment, one of the activation timer remaining period and the counting speed or both can be changed.

Specifically, the activation condition change control section 232 includes a first timer period change section 234, and changes the timer period of the medium object (chest 5) deployed on the game field 20 by the deploying control section 228. The timer period may be changed by changing one of the remaining time and the counting speed or both. Specifically, in a configuration where the counting speed is changed, the counting speed may be changed in accordance with a deployed position of the medium object, in such a manner that the timer period elapses faster than in a case where the medium object (chest 5) is not deployed on the game field 20. When the deploying of the medium object on the game field is terminated, or the game related to the game field is terminated, the counting speed can be restored to a value before the deploying on the game field.

The activation condition change control section 232 includes a second timer period change section 236, and changes the timer period when a certain character makes an action within a certain area of influence in the game field 20 with a medium object included in the area of influence. Specifically, the timer remaining period is changed. In the present embodiment, the "action within a certain area of influence by the character" is an event in which the character 4 performs an attack within a determined attackable range, or makes an action such as contacting or approaching. When this event occurs, the activation timer remaining time of the chest 5 that has been deployed decreases.

The activation condition change notification control section 238 performs control for notifying the player of a changed timer period. In the present embodiment, this control corresponds to the control for displaying the activation condition change notification 40 (see FIG. 5).

The acquisition control change section 240 changes the content object associated with the medium object deployed on the game field. In the present embodiment, this occurs when the acquisition control change requirement is satisfied (see FIG. 5).

The acquisition control change notification control section 242 performs control for notifying the player of the change in the acquisition control. In the present embodiment, this is implemented through the control for displaying the acquisition control change notification 42 (see FIG. 5).

The fusion control section 244 performs control for fusing a plurality of medium objects possessed by the player into a single medium object in accordance with an operation performed by the player. The fusion may be performed with a content object associated with the single medium object as a result of the fusion set based on the content objects associated with the plurality of medium objects involved in the fusion.

Specifically, the fusion control section 244 executes:
1) selecting a medium object serving as the material and a medium object serving as a fusion target (target) in accordance with an operation performed by a player;
2) consuming the medium object serving as the material, and changing the content object associated with the target medium object serving as the fusion target (target) based on the combination between the medium object serving as the material and the medium object serving as the fusion target; and
3) consuming the medium object serving as the material and changing the content object associated with the medium object serving as the fusion target, based on the content object associated with the medium object serving as the material and the medium object serving as the fusion target (target).

In the present embodiment, this corresponds to control of changing the total number of rewards and the reward rarity allocation of the chest 5 serving as the target of the power-up fusion, based on the original total number of rewards and the original reward rarity allocation of the chest 5 serving as the target and the total number of rewards and the reward rarity allocation of the chest 5 serving as the material (see FIG. 7). The total number of rewards and the reward rarity allocation indicate the number of rewards corresponding to each rarity. Thus, the fusion control section 244 functions as a second acquisition control change section that changes the details of the acquisition control for the fusion of the medium objects.

More specifically, the fusion control section 244 can set group identification information (for example, rarity) of the content object associated with a single medium object as a result of the fusing, based on the group identification information (for example, rarity) on the content objects each associated with a corresponding one of the plurality of medium objects to be fused.

The fusion control section 244 can associate the medium object serving as the fusion target after the fusion with the number of content objects fewer than the sum of the number of content objects associated with the medium object serving as the material and the number of content objects associated with the medium object serving as the fusion target. The group identification information (for example, rarity) on the content object associated with a single medium object as a result of the fusion may be the group identification information with a higher rarity than the group identification information (for example, rarity) on the content objects associated with a plurality of medium objects before the fusion.

The fusion control section 244 functions as the second activation control section, and can set the activation condition of the medium object serving as the fusion target to be different from that before the fusion. Specifically, the activation condition is satisfied when the timer period set to the medium object elapses, and the timer period set to the medium object serving as the fusion target may be set to be shorter than that before the fusion.

When the activation condition for the transition from the acquisition suspended state to the acquisition enabled state in which the content is acquirable is satisfied, the activation control section 246 can implement the transition from the acquisition suspended state to the acquisition enabled state so that the content object associated with the medium object becomes acquirable.

The notification control section 248 performs control for issuing a notification indicating that there is a medium object that has transitioned to the acquisition enabled state due to the control performed by the activation control section 246. In the present embodiment, this control corresponds to the control for displaying the activation enabled notification 44 and the activation enabled message 45 (see FIG. 6).

The acquisition control section 250 performs control so that when a medium object deployed on the game field transitions to the acquisition enabled state while the game is in process, the content objects associated with the medium object can be sequentially acquired in response to the predetermined acquisition action. In other words, the content objects are given to players in order of first-come-first-served basis. Specifically, the content objects to be acquired are selected from the group of content objects associated with the group identification information associated with the medium object, to be acquired by the player.

In the present embodiment, the acquisition control includes: receiving an acquisition operation on the chest 5 with the activation condition satisfied (corresponding to an operation of opening the chest 5); and selecting, for each rarity associated with the chest 5 serving as the target of the acquisition operation, a reward to be provided to the player from reward candidates set to the rarity. Specifically, the content object to be the reward to be finally provided is selected from each of groups of content objects defined based on the group identification information.

In the present embodiment, the control is performed so that after the activation condition of the deployed chest 5 has been satisfied, the ownership of the chest 5 (the chest that is in the acquisition enabled state so that the content can be acquired any time) is transferred to the owner of the character 4 that has made the first attack or contact.

The timer section 280s uses a system clock to measure the current date and time, a time limit, or the like.

The sound generation section 290s is implemented by execution of an IC or software for generating or decoding sound data, and generates or decodes sound data such as operation sound and BGM related to the system management of the server system 1100 or the gameplay. The sound signal related to the system management is output to the sound output section 390s.

The sound output section 390s emits a sound signal and is a speaker (not illustrated) in the main body device 1101 or the touch panel 1108 in the example illustrated in FIG. 1.

The image generation section 292s can generate an image related to system management for the server system 1100, a game image (or data for displaying the game image on the user terminal 1500), and the like. The image related to the system management may be output to the image display section 392s.

The image display section 392s displays various images for the system management based on an image signal received from the image generation section 292s, and may be implemented by an image display device such as a flat panel display, a cathode ray tube (CRT), a projector, or a head mounted display. The image display section 392s corresponds to the touch panel 1108 in the example illustrated in FIG. 1.

The communication control section 294s executes data processing related to the data communications, so that data can be exchanged with an external device via the communication section 394s The communication section 394s is connected to the communication line 9 so that communications can be performed. For example, the communication section 394s is implemented by a wireless communication device, a modem, a terminal adaptor (TA), a jack for a cable for wired communications, a control circuit, and the like. The communication section 394s corresponds to the communication device 1153 in the example illustrated in FIG. 1.

The server storage section 500s stores a program, various types of data, and the like for implementing various functions for the server processing section 200s to perform overall control on the server system 1100. The server storage section 500s is also used as a work area for the server processing section 200s, and temporarily stores a result of calculation executed by the server processing section 200s in accordance with various programs and the like. For example, this function is implemented by an IC memory such as a RAM or a ROM, a magnetic disk such as hard disk, an optical disk such as a CD-ROM or a DVD, an online storage, or the like. This function corresponds to a storage medium such as the IC memory 1152 and hard disk, mounted on the main body device 1101, or the storage 1140 in the example illustrated in FIG. 1

Figure 9:
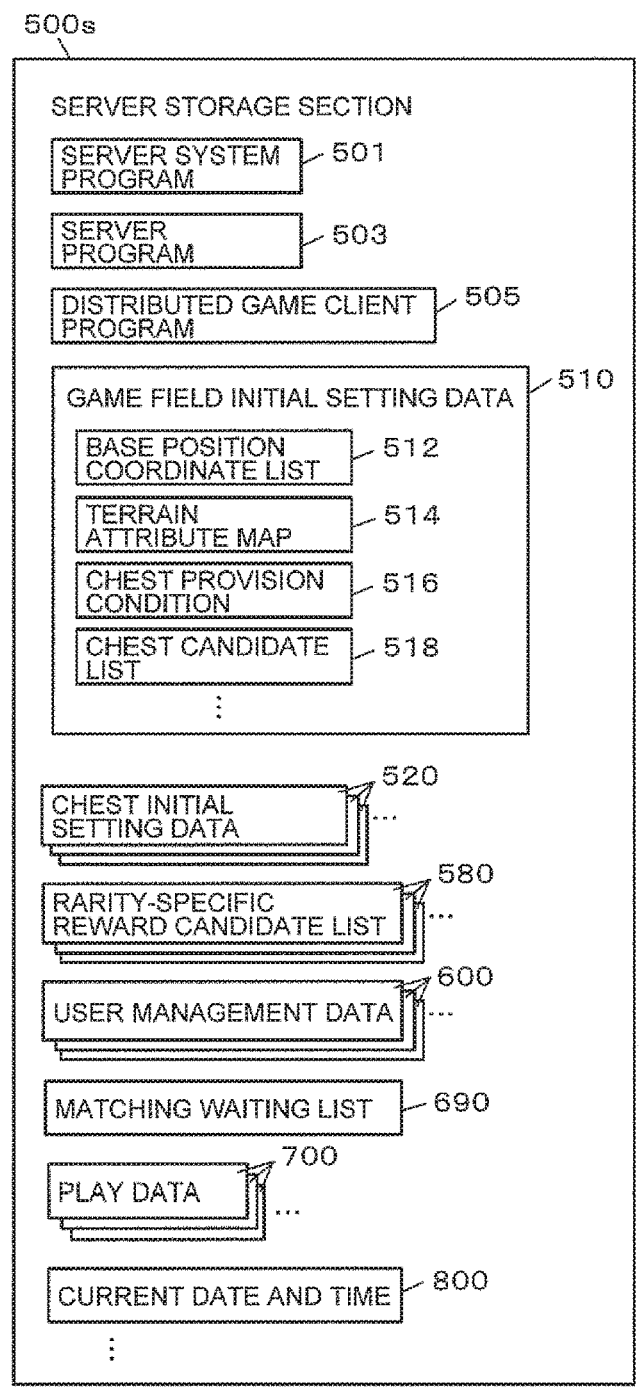
FIG. 9 is a view illustrating an example of programs and data stored in a server storage section according to the first embodiment.

FIG. 9 is a view illustrating an example of programs and data stored in the server storage section 500s according to the present embodiment. The server storage section 500s stores therein a server system program 501, a server program 503, a distributed game client program 505, game field initial setting data 510, chest initial setting data 520, and a rarity-specific reward candidate list 580 in advance.

The server storage section 500s may also store therein data sequentially generated/managed. Such data includes user management data 600, a matching waiting list 690, play data 700, and current date and time 800. Furthermore, information such as timer, counter, and various flags may be stored as necessary.

The server system program 501 is read and executed by the server processing section 200s so that a basic input/output function as a computer is implemented in the server system 1100.

The server program 503 is read and executed by the server processing section 200s so that functions of the user management section 202, the online shopping management section 210, and the game management section 220 are implemented (see FIG. 8).

The distributed game client program 505 is the original of a game client program provided to the user terminal 1500.

The game field initial setting data 510 stores various definition data related to the game field 20. Examples of such data include: a base position coordinate list 512 indicating position coordinates in a field coordinate system for each of the bases 23z and 23p (see FIG. 4); a terrain attribute map 514 defining settings on terrain attributes at each position in the game field 20; a chest provision condition 516 defining a condition for providing a new chest 5; and a chest candidate list 518 indicating selectable candidates of the chest 5 to be newly provided. Note that data other than these may be stored as appropriate.

In the present embodiment, the timer counting speed for the chest 5 increases depending on the terrain attribute. Thus, the terrain attribute map 514 may define a value by which the counting speed is multiplied, instead of the type of terrain attribute, for each range of field coordinates.

The chest provision condition 516 is a condition for providing the new chest 5 to the player, and can be set as appropriate. In the present embodiment, this condition is satisfied when the base 23 of the opponent is destroyed.

Figure 10:
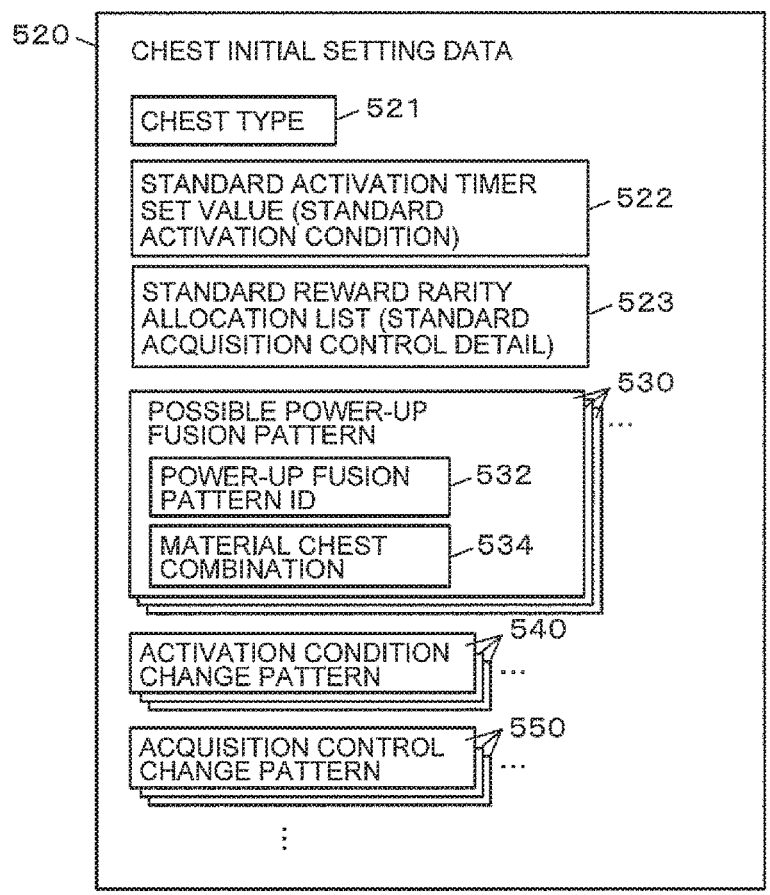
FIG. 10 is a view illustrating an example of a data configuration of chest initial setting data.

The chest initial setting data 520 is prepared for each type of the chest 5 in the game, and stores various definition data related to the chest. For example, as illustrated in FIG. 10, one chest initial setting data 520 includes a unique chest type 521, a standard activation timer set value 522, a standard reward rarity allocation list 523, a possible power-up fusion pattern 530, an activation condition change pattern 540, and an acquisition control change pattern 550.

The standard activation timer set value 522 corresponds to the initial setting of the activation condition of the chest. More specifically, the standard activation timer set value 522 is an initial setting value indicating a time required for the chest 5 to be openable, that is, a time required for the content of the chest 5 to be acquirable by the player.

The standard reward rarity allocation list 523 corresponds to an initial setting on the acquisition control for the chest of the corresponding type. In the present embodiment, the number of rewards, provided to the player from the chest, is defined for each rarity. For example, when the number of provided rewards is "3" and one of rewards corresponding to each of three types of rarities is selected to be provided, information "A rare", "B rare" and "C rare" or the like is stored. The rarity is an example of the group identification information. In such a configuration, one of reward candidates associated with each of a corresponding one of A rare, B rare, and C rare in advance is selected as a reward to be finally provided to the player. When the number of provided rewards is "5" and one of rewards corresponding to each of three types of rarities is selected to be provided, information "A rare", "B rare", "B rare", "C rare", and "C rare" or the like is stored. In this configuration, one of the reward candidates corresponding to A rare is selected, two of the reward candidates corresponding to B rare are selected, and two of the reward candidates corresponding to C rare are selected.

The possible power-up fusion pattern 530 is prepared for each possible pattern of the chest of the corresponding type. One possible power-up fusion pattern 530 includes a unique power-up fusion pattern ID 532 and a material chest combination 534. The material chest combination 534 is a list in which the type of the chest 5 serving as the material and the corresponding number of chests are associated with each other.

Figure 11:
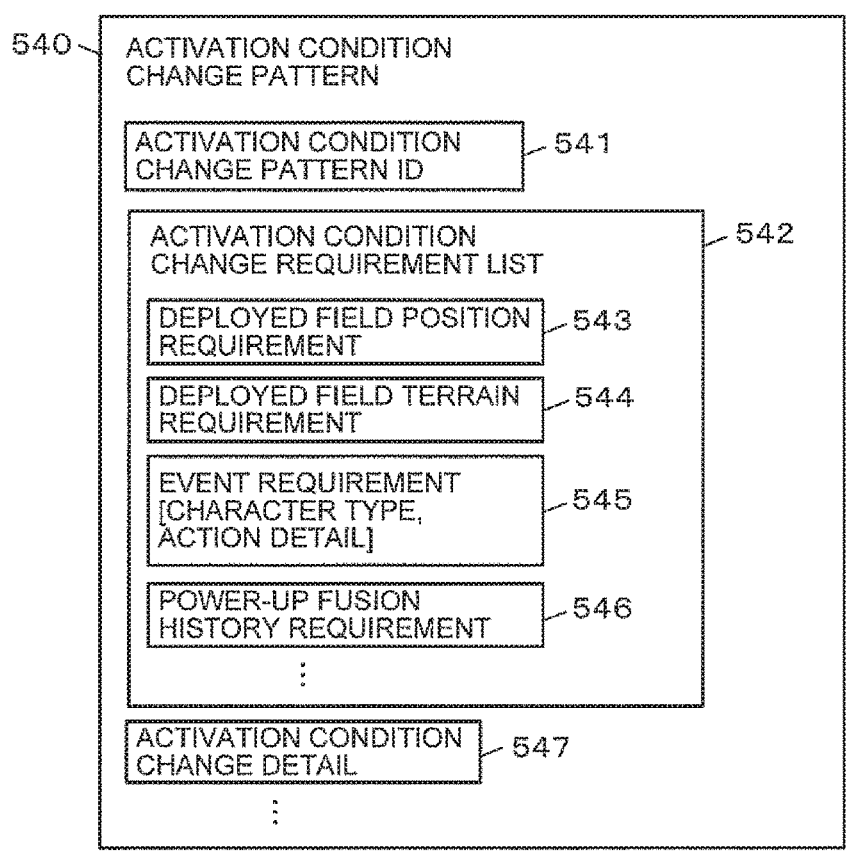
FIG. 11 is a view illustrating an example of a data configuration of an activation condition change pattern.

The activation condition change pattern 540 is prepared for each combination between the condition for changing the activation condition of the chest and the content to be changed. For example, as illustrated in FIG. 11, one activation condition change pattern 540 includes a unique activation condition change pattern ID 541, an activation condition change requirement list 542, and an activation condition change detail 547. Note that data other than these can be included as appropriate.

The activation condition change requirement list 542 defines requirements related to various game progression statuses to be achieved for applying the change pattern. In the present embodiment, the list includes a deployed field position requirement 543, a deployed field terrain requirement 544, an event requirement 545, and a power-up fusion history requirement 546, associated with each other under an AND condition. Although the AND condition is set, each requirement may be not required (not set). For example, only the deployed field position requirement 543 in the activation condition change requirement list 542 may be set as the requirement for a certain chest 5. Note that data other than these can be included as appropriate. For example, requirements related to a player level, the number of times the game is played, used times and prices for the online shopping, and the like may be included as appropriate.

The field position requirement 543 defines a requirement related to a deployed position of the chest 5 in the game field 20. For example, a range of a relative distance from the base 23, a relative positional relationship with respect to another chest, and the like may be defined. A predetermined value (for example, NULL), indicating "not required", may be set as a set value of the requirement.

The deployed field terrain requirement 544 defines a condition on a terrain attribute of a position where the chest 5 is deployed. A predetermined value (for example, NULL), indicating that "any terrain attribute may be set", may be set as a set value of the requirement.

The event requirement 545 defines a condition on an event related to the character 4 that has been deployed on the game field 20, and an event related to an event in the game field 20. Attacking by the character, approaching and contacting by the character, and use of a certain spell by the character may be set as the event related to an action of the character 4. For example, an earthquake, climate change, day/night, and the like may be set as an event related to the event in the game field 20. A set value of this requirement may be a predetermined value (for example, NULL), indicating that the requirement is "not required".

The power-up fusion history requirement 546 defines a power-up fusion pattern that needs to be performed for the chest 5. For example, a list of the specific power-up fusion pattern ID 532 (see FIG. 10), the number of times the power-up fusion is performed with any power-up fusion pattern, and the like may be defined. A set value of this requirement may be a predetermined value (for example, NULL), indicating that the requirement is "not required".

The activation condition change detail 547 defines the detail of the change in the activation condition applied when the AND condition of the requirements defined in the activation condition change requirement list 542 is satisfied. In the present embodiment, for example, a value by which the elapsing speed of the timer period until the activation is multiplied and a reduced amount of the remaining period are defined.

Figure 12:
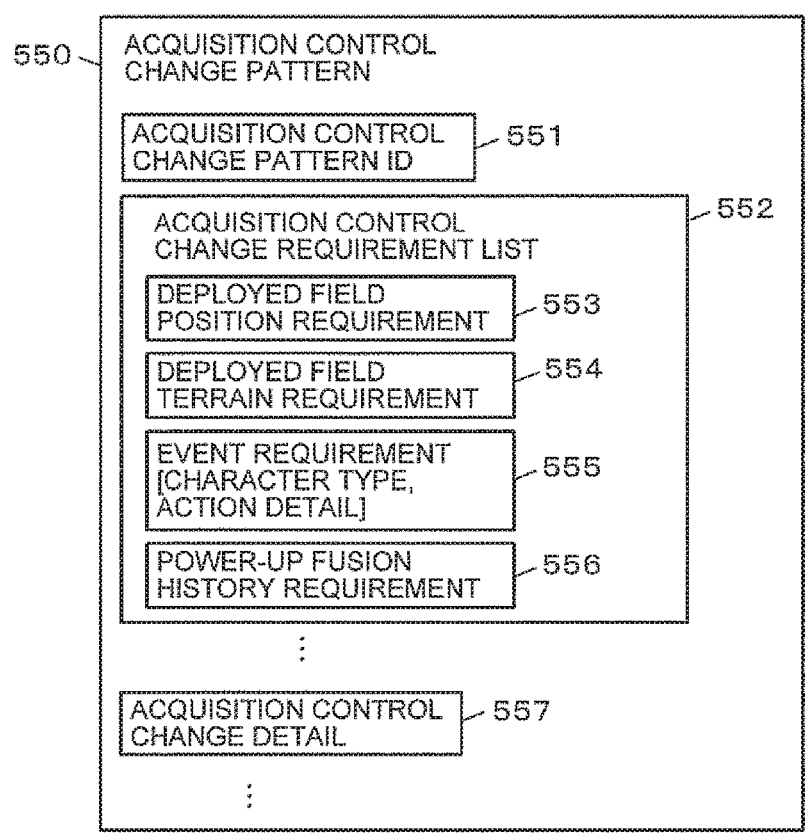
FIG. 12 is a view illustrating an example of a data configuration of an acquisition control change pattern.

Referring back to FIG. 10, the acquisition control change pattern 550 is prepared for each pattern for changing the details of the acquisition control of the chest 5, and stores various types of data defining the requirements for applying the patterns and changing the details. For example, as illustrated in FIG. 12, one acquisition control change pattern 550 includes a unique acquisition control change pattern ID 551, an acquisition control change requirement list 552, and an acquisition control change detail 557. Note that data other than these may be included as appropriate.

The acquisition control change requirement list 552 defines requirements related to various game progression statuses that need to be achieved for applying the change pattern. In the present embodiment, the requirements include a deployed field position requirement 553, a deployed field terrain requirement 554, an event requirement 555, and a power-up fusion history requirement 556, associated with each other under the AND condition. Although the AND condition is set, each requirement may be not required (not set). For example, only the deployed field position requirement 553 in the acquisition control change requirement list 552 may be set as the requirement for a certain chest 5.

These requirements are similar to the deployed field position requirement 543, the deployed field terrain requirement 544, the event requirement 545, and the power-up fusion history requirement 546 (see FIG. 11). Note that data other than these can be included as appropriate. For example, requirements related to a player level, the number of times the game is played, used times and prices for the online shopping, and the like may be included as appropriate.

The acquisition control change detail 557 defines a change in the acquisition control applied when the AND condition defined by the acquisition control change requirement list 552 is satisfied. In the present embodiment, the setting of the standard reward rarity allocation list 523 (see FIG. 10) after the change is set.

For example, the standard reward rarity allocation list 523 may be has the setting "A rare", "B rare", and "C rare" in which the number of provided rewards is "3" and one reward is selected to be provided for each of the three types of rarities. In such a configuration, when the number of rewards is decremented by 1, the rarity of one of the rewards is increased. In such a case, values such as "S rare (higher rarity than A rare)" and "B rare" may be set.

Referring back to FIG. 9, the rarity-specific reward candidate list 580 is a list of reward candidates classified based on the rarity set to each of the reward candidate.

Figure 13:
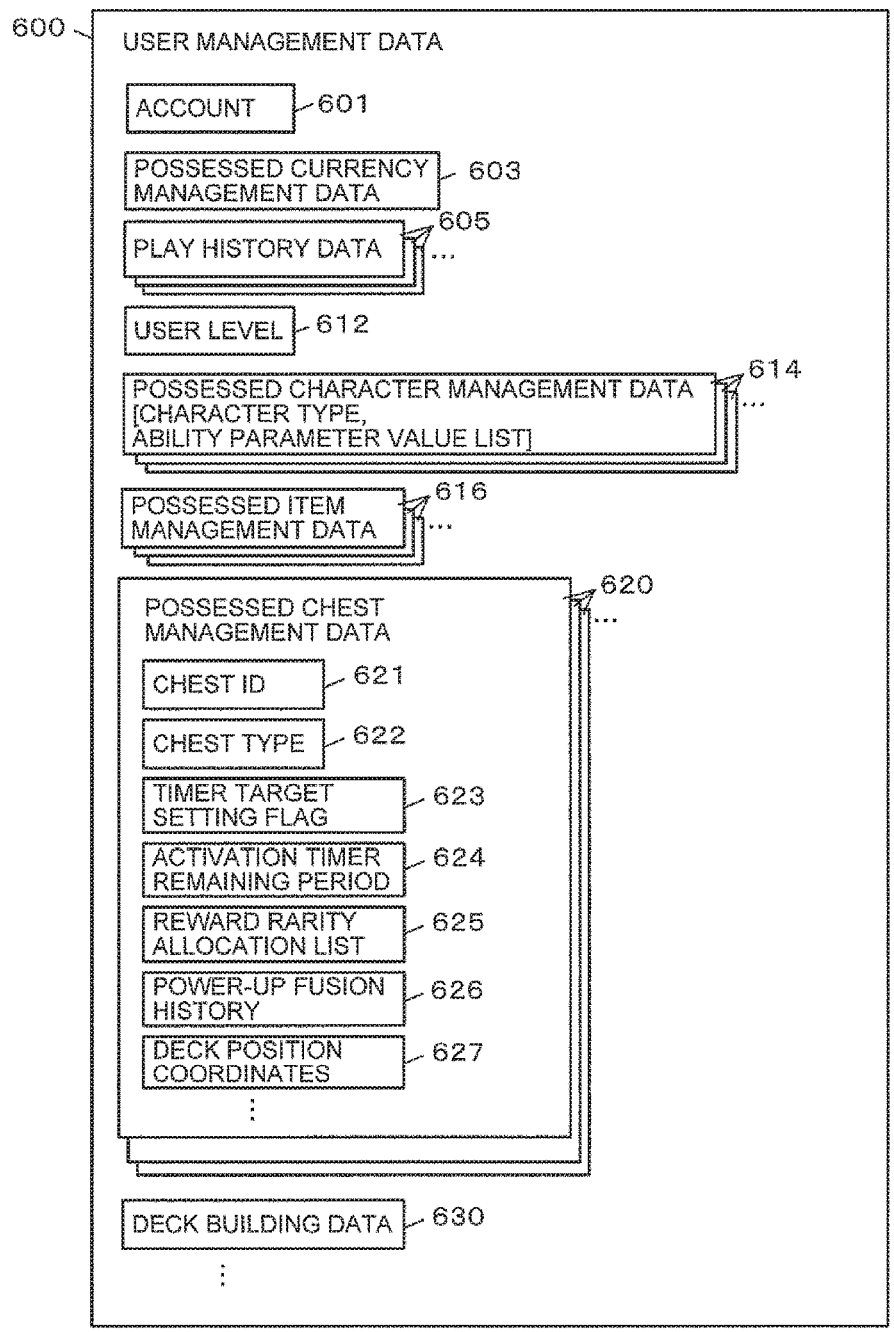
FIG. 13 is a view illustrating an example of a data configuration of user management data.

The user management data 600 is prepared for each registered user, and includes various types of data associated with an account as the unique identification information. In the present embodiment, as illustrated in FIG. 13, one user management data 600 includes a unique account 601, possessed currency management data 603, play history data 605, a user level 612, possessed character management data 614, possessed item management data 616, possessed chest management data 620, and deck building data 630. Note that data other these may be included as appropriate.

The possessed currency management data 603 is a balance history of the currency used for paying a cost of charging elements (for example, online shopping, purchased lottery, play fee, and item purchasing), that is, a possessed currency. For example, update date and time, update reason, changed amount, and remaining possessed currency are chronologically stored while being associated with each other. The data can be regarded as an account book, and is updated for each purchasing, distribution, and payment involving the possessed currency.

The play history data 605 includes data indicating when the game has been played in the past in the chronological order in accordance with the playing, and is automatically updated at the timing of login/logout.

The possessed character management data 614 is prepared for each character 4, as one type of the game objects possessed by the user, and includes various types of data indicating the state of the character. One possessed character management data 614 stores the type of character, an ability parameter value list, and the like, for each unique character ID. Note that data other than these can be included as appropriate. In the present embodiment, the possessed character management data 614 on a character used for building the deck is updated each time the ability parameter value changes to be higher in accordance with the result of the game played by the player in the game.

The possessed item management data 616 is prepared for each item possessed by the user, and includes various types of data indicating the state of the item.

The possessed chest management data 620 is prepared for each chest 5 possessed by the user, and includes various types of data indicating the state of the chest 5. One possessed chest management data 620 includes a unique chest ID 621, a chest type 622, a timer target setting flag 623, an activation timer remaining period 624, a reward rarity allocation list 625, a power-up fusion history 626, and deck position coordinates 627 indicating an allocated location of the chest, used for building the deck, in the deck display section 22 (see FIG. 4). It is a matter of course that data other than these can be included as appropriate.

The timer target setting flag 623 is set to be "1" for the chest 5 set to be the timer target, and is set to be "0" for the chest 5 is not set to be the timer target. A newly provided chest 5 has an initial value "0".

The activation timer remaining period 624 indicates a state of the activation condition of the chest 5 according to the present embodiment. When the chest 5 is set as the timer target, the remaining time automatically decreases at the same rate as the actual elapse of time, even when the chest 5 is not used for the deck building. When the chest 5 is used for the deck building and is deployed on the game field 20, the remaining time decreases at equal or double speed, depending on the terrain attribute of the deployed position. When the remaining time decreases to "0", the activation condition is satisfied. For the newly provided chest 5, the standard activation timer set value 522 (see FIG. 10) is copied.

The reward rarity allocation list 625 indicates the latest detail of the acquisition control of the chest according to the present embodiment. For the newly provided chest 5, the standard reward rarity allocation list 523 (see FIG. 10) is copied.

The power-up fusion history 626 is a list of the power-up fusion pattern IDs 532 (see FIG. 10) of the power-up fusion executed for the chests 5.

The deck position coordinates 627 includes coordinates indicating an allocated location of the chest, used for building the deck, in the deck display section 22 (see FIG. 4), and are set to be a predetermined value indicating "unselected" for a chest not used for the deck building.

The deck building data 630 is a list of character IDs and chest IDs 621 of the characters 4 and the chests 5 used for building the deck.

Referring back to FIG. 9, the matching waiting list 690 is a list of accounts of users who are requesting for a match.

The play data 700 is prepared for each gameplay, that is, for each matching, and includes various types of data indicating a game progression status, control data on each character, and various types of information related to displaying on the game screen or the like.

Figure 14:
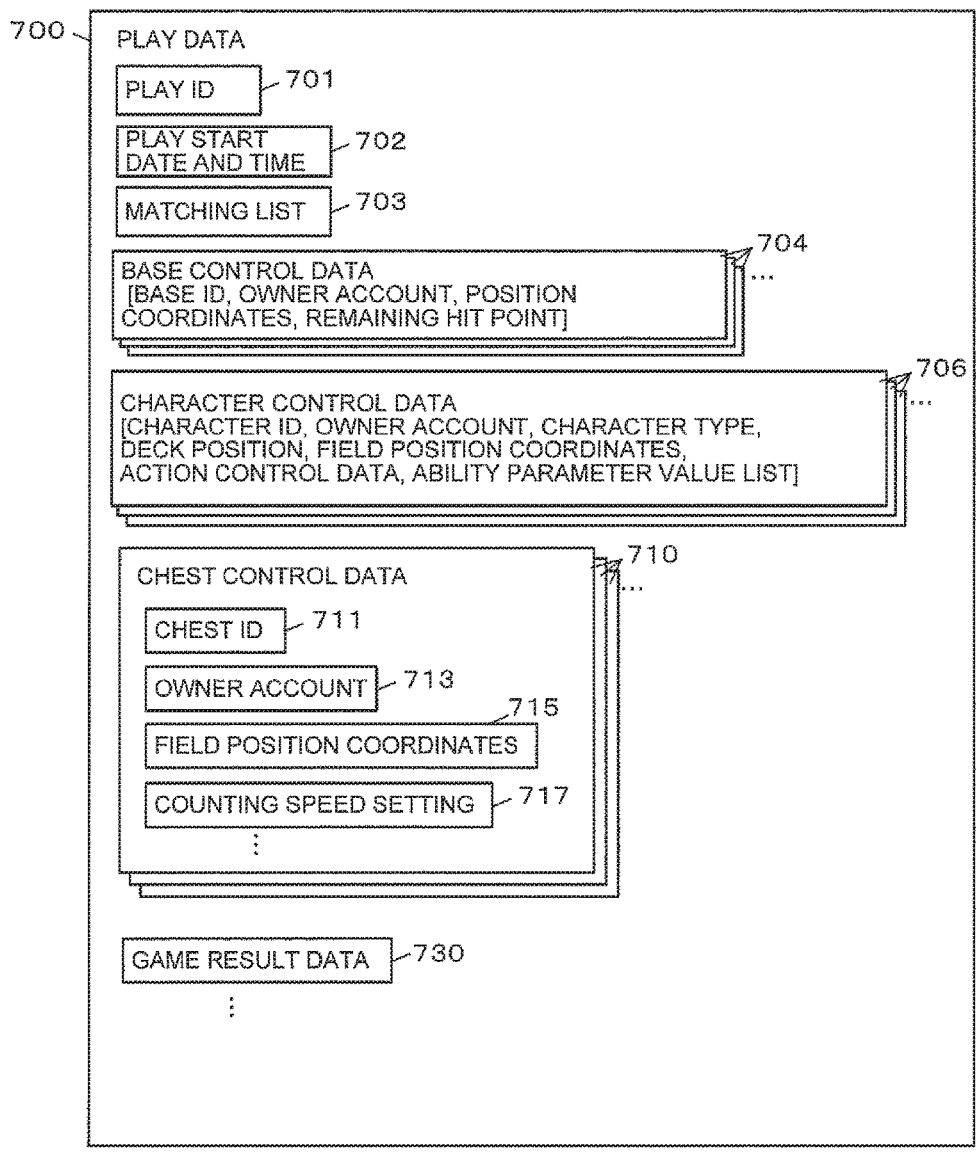
FIG. 14 is a view illustrating an example of a data configuration of play data.

For example, as illustrated in FIG. 14, one play data 700 includes: a unique play ID 701; play start date and time 702; a matching list 703 including the accounts 601 (see FIG. 13) of the players 2 that have been matched; base control data 704; character control data 706; chest control data 710; and game result data 730. Note that data other than these can be included as appropriate.

The base control data 704 is prepared for each base 23 (see FIG. 4) deployed on the game field 20, and includes various types of data indicating the state of the base 23. For example, one base control data 704 includes a base ID, an owner account indicating the player 2 as the owner of the base; position coordinates; and a remaining hit point, associated with each other. Note that data other than these can be included as appropriate. The initial state of the base control data 704 corresponds to the game field initial setting data 510 (see FIG. 9).

The character control data 706 is prepared for each character 4 used in the game (see FIG. 4), that is, each character in the built deck, and includes various types of data indicating the state of the character. For example, one character control data 706 includes: a character ID; an owner account; a character type; a deck position; field position coordinates; action control data as data for automatically controlling an action of the character; and an ability parameter value list, associated with each other. For the position coordinates of a character not deployed on the game field 20, position coordinates indicating an allocated location of the character in the deck display section 22 (see FIG. 4) are set. Note that data other than these may be included as appropriate.

The chest control data 710 is prepared for each chest 5 used in the game (see FIG. 4), that is, the chest 5 used for building the deck, and includes various types of data indicating the state of the chest 5.

For example, one chest control data 710 includes: a chest ID 711; an owner account 713 indicating the player 2 as the owner of the chest 5; field position coordinates 715 indicating a deployed position in the game field 20; and a counting speed setting 717. Note that data other than these may be included as appropriate.

For the chest 5 not deployed on the game field 20, a predetermined value indicating that the chest is not deployed is set to the field position coordinates 715.

The counting speed setting 717 indicates the counting speed of the activation timer applied while the chest 5 is in the game field 20. An initial value of this setting is "1.0" indicating that the counting speed is the same as that in the real world. For the chest 5 deployed on the game field 20, the value changes to that corresponding to the terrain attribute associated with the deployed position (for example, the value is set to be "1.1" indicating that the counting speed is 1.1 times faster than that in the real world). Basically, the counting speed setting 717 is effective as long as the chest 5 is on the game field 20, or until the gameplay is terminated.

Figure 15:
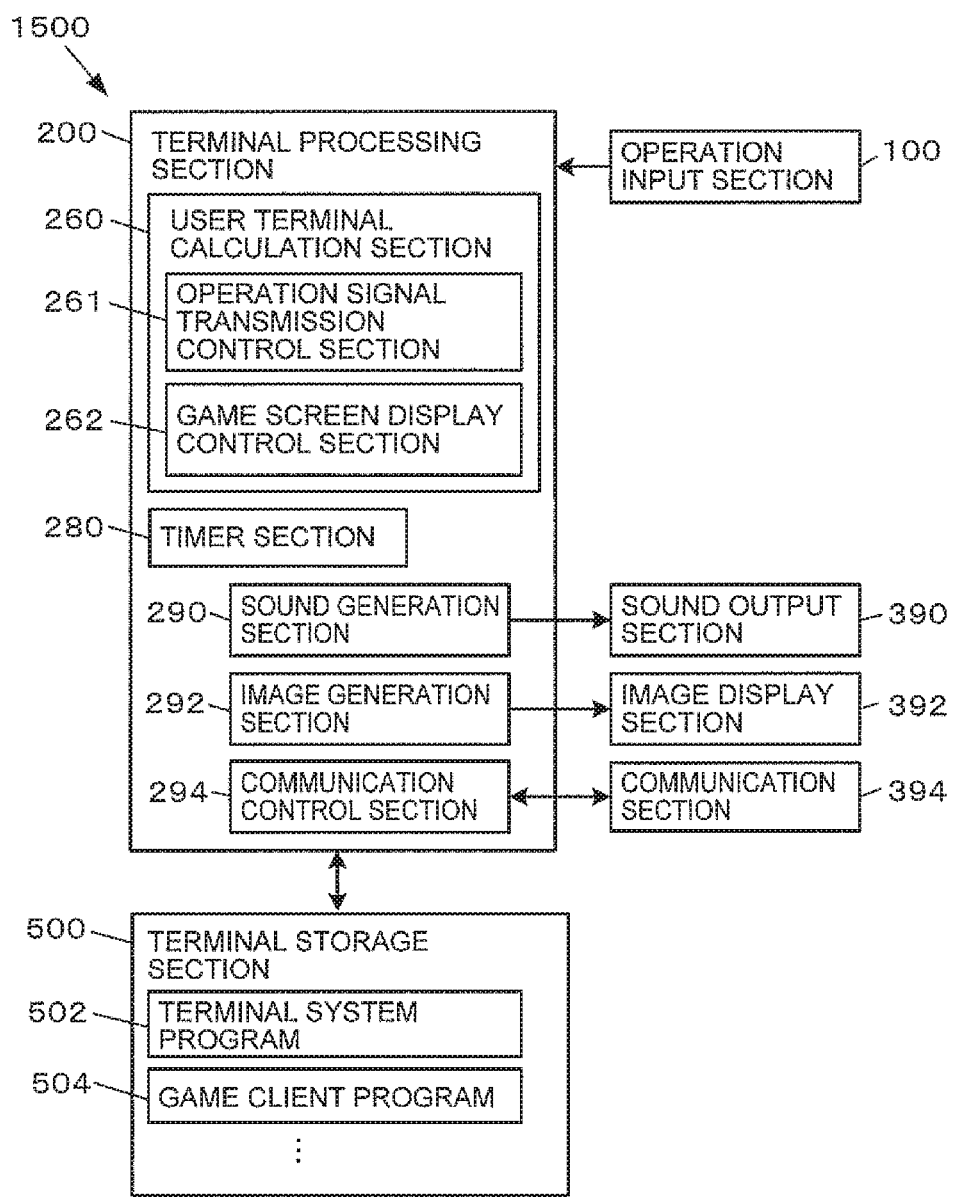
FIG. 15 is a functional block diagram illustrating an example of a functional configuration of a user terminal according to the first embodiment.

FIG. 15 is a functional block diagram illustrating an example of a functional configuration of the user terminal 1500 according to the present embodiment. The user terminal 1500 according to the present embodiment includes an operation input section 100, a terminal processing section 200, a sound output section 390, an image display section 392, a communication section 394, and a terminal storage section 500.

The operation input section 100 outputs an operation input signal to the terminal processing section 200 in accordance with various input operations performed by the player. For example, the operation input section 100 can be implemented by a push switch, a joystick, a touchpad, a trackball, a velocity sensor, a gyro, a CCD module, a GPS module, or the like. The operation input section 100 corresponds to the arrow key 1502, the switch button 1504, the touch panel 1506, and the position measurement module 1555 in FIG. 2.

For example, the terminal processing section 200 is implemented by a microprocessor such as a CPU or a GPU, or an electronical component such as an ASIC or an IC memory. The terminal processing section 200 performs control for outputting and receiving data to and from functional sections including the operation input section 100 and the terminal storage section 500. The terminal processing section 200 performs various calculation processes based on a predetermined program and data, the operation input signal from the operation input section 100 and various types of data received from the server system 1100, to control the operation of the user terminal 1500. The terminal processing section 200 corresponds to the control board 1550 in FIG. 2. The terminal processing section 200 according to the present embodiment includes a user terminal calculation section 260, a timer section 280, a sound generation section 290, an image generation section 292, and a communication control section 294.

The user terminal calculation section 260 includes an operation signal transmission control section 261 and a game screen display control section 262.

The operation signal transmission control section 261 executes processing for transmitting various types of data and a request to the server system 1100, in accordance with an operation attempted on the operation input section 100.

The game screen display control section 262 performs control for displaying the game screen based on the various types of data received from the server system 1100. In this configuration, a game space image (for example, a 3DCG image or the like) is generated in the server system 1100. Alternatively, a configuration in which the game space image is generated in the user terminal 1500 may be employed. In this configuration, for example, the game screen display control section 262 may control an object in a virtual three-dimensional space for generating the 3DCG.

For example, the sound generation section 290 is implemented by a digital signal processor (DSP), a processor such as a sound synthesis IC, an audio codec for playing a sound file, or the like. The sound generation section 290 generates a sound signal, corresponding to sound effects, a BGM, and various operation sounds related to the game, based on a result of the processing executed by the game screen display control section 262, and outputs the signal to the sound output section 390.

The sound output section 390 is implemented by a device that outputs sound as the sound effects, the BGM, or the like, based on the sound signal received from the sound generation section 290, and corresponds to the speaker 1510 in FIG. 2.

For example, the image generation section 292 is implemented by a GPU, a processor such as a DSP, a video signal IC, a program such as a video codec, a rendering frame IC memory such as a frame buffer, or the like.

The image generation section 292 generates a single image of the game screen per frame time (for example, one image per 60 seconds) based on various types of data received from the server system 1100, and outputs a signal corresponding to the generated image of the game screen to the image display section 392.

The image display section 392 displays various game images based on the image signal received from the image generation section 292. For example, the image display section 392 may be implemented by an image display device such as a flat panel display, a CRT, a projector, or a head mounted display. In the present embodiment, the image display section 392 corresponds to the touch panel 1506 in FIG. 2.

The communication control section 294 executes data processing related to data communications to exchange data with an external device via the communication section 394. The communication section 394 is connected to the communication line 9 so that communications can be implemented. For example, the communication control section 294 is implemented by a wireless communication device, a modem, a terminal adaptor (TA), a jack for a cable for wired communications, a control circuit, and the like, a corresponds to the wireless communication module 1553 in FIG. 2.

The terminal storage section 500 stores a system program, a program required for the gameplay, various types of data, and the like for implementing various functions for the terminal processing section 200 to perform overall control on the user terminal 1500. The terminal storage section 500 is also used as a work area for the terminal processing section 200, and temporarily stores a result of calculation executed by the terminal processing section 200 in accordance with various programs, input data received from the operation input section 100, and the like. For example, this function is implemented by an IC memory such as a RAM or a ROM, a magnetic disk such as hard disk, an optical disk such as a CD-ROM or a DVD, or the like. This function corresponds to the IC memory 1552 mounted on the control board 1550 or the memory card 1540 in FIG. 2.

The terminal storage section 500 according to the present embodiment stores a terminal system program 502 and a game client program 504. Note that the terminal storage section 500 may store other data as necessary.

The terminal system program 502 is a program for implementing a basic input/output function as a computer in the user terminal 1500.

The game client program 504 is application software that is read and executed by the terminal processing section 200 for implementing the function of the user terminal calculation section 260, and may be embedded as a part of the terminal system program 502. The game client program 504 according to the present embodiment is a copy of the distributed game client program 505 provided by the server system 1100 (see FIG. 9).

The game client program 504 may be a dedicated program, or may be configured with a web browser program and a plugin for implementing interactive image displaying, depending on a technique and a method for implementing an online game.

[Processing]

Next, a flow of processing in the server system 1100 is described. The flow of the processing described below is implemented when the server processing section 200s executes the server system program 501 and the server program 503.

Figure 16:
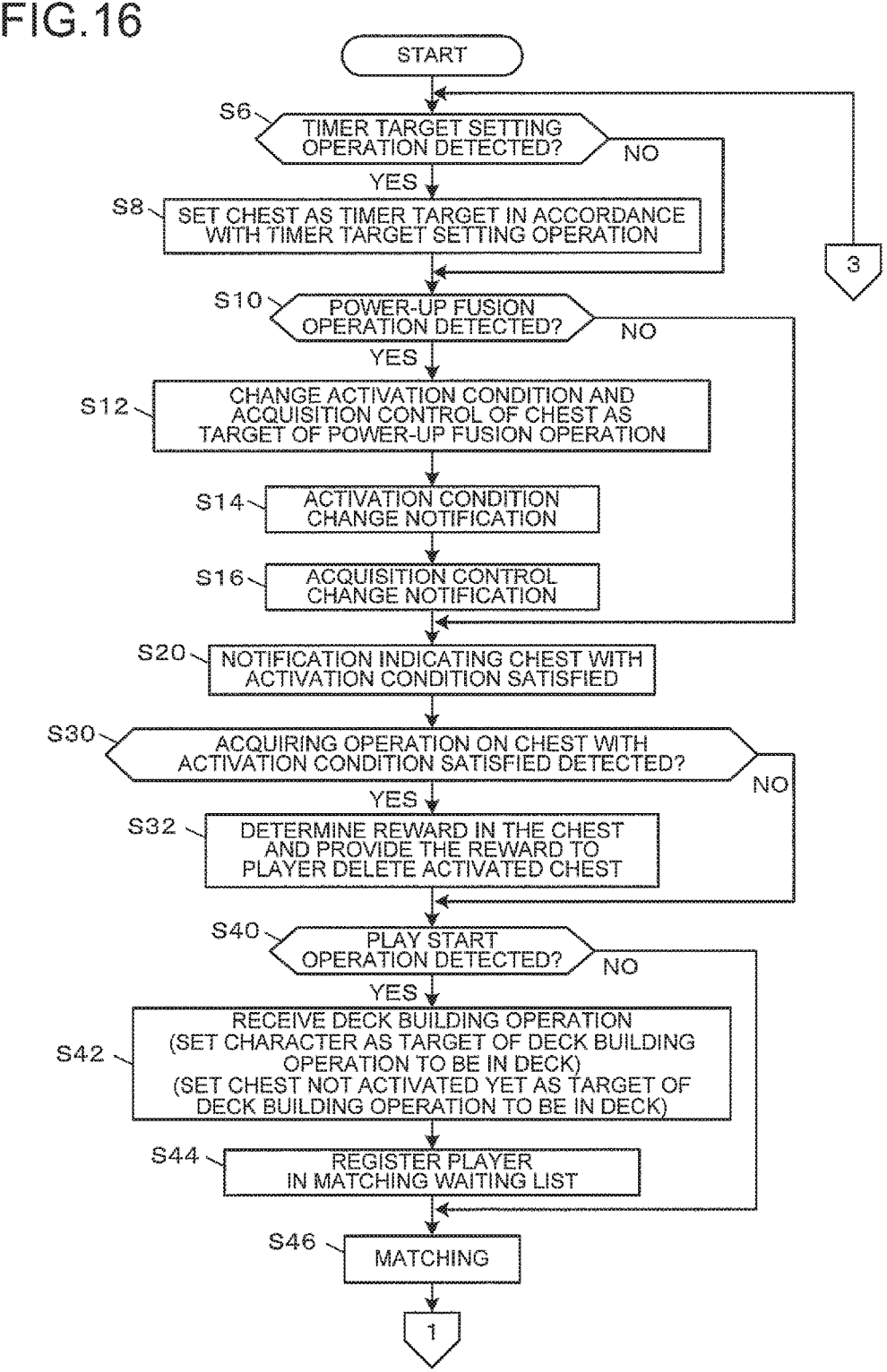
FIG. 16 is a flowchart illustrating the flow of the processing in the server system according to the first embodiment.
Figure 17:
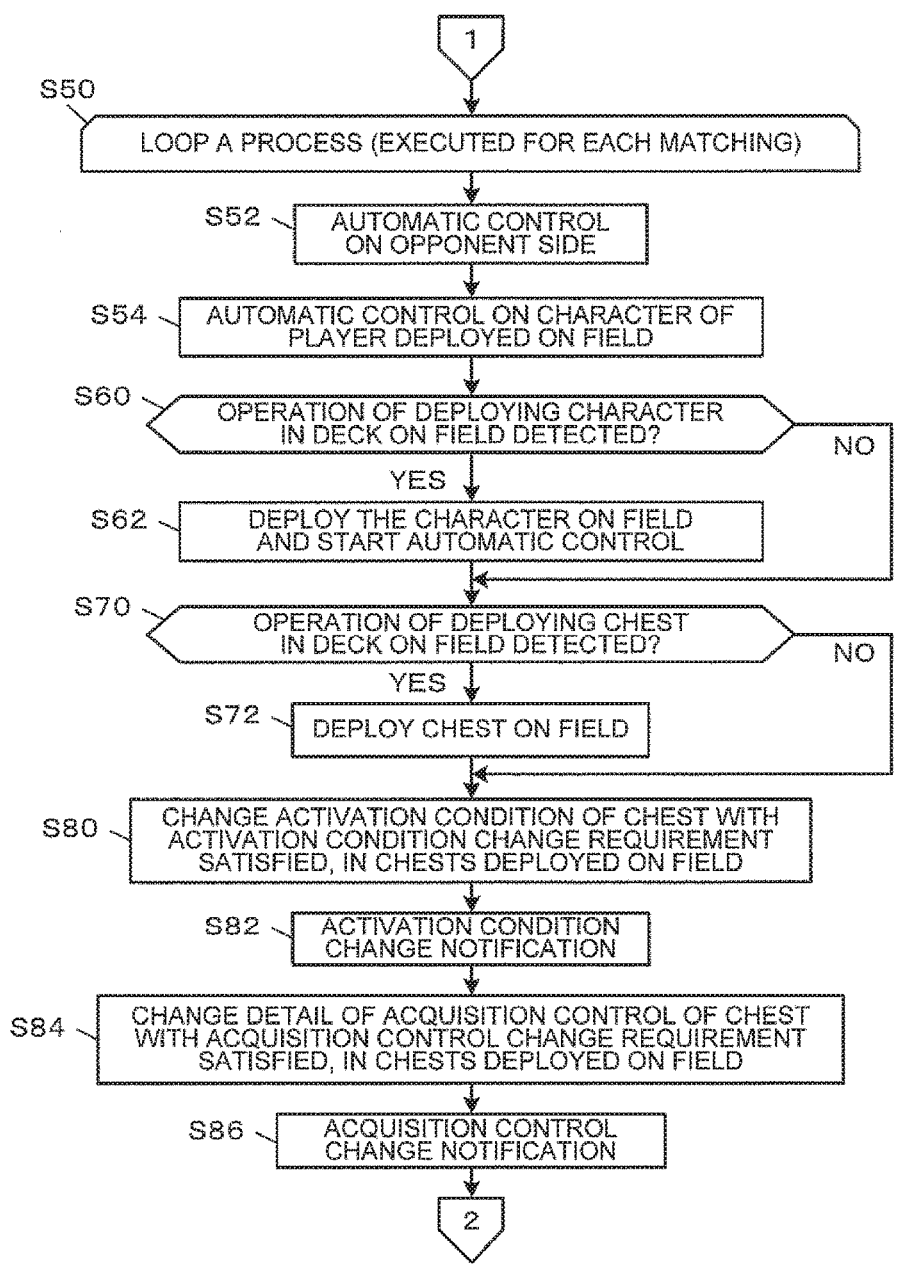
FIG. 17 is a flowchart continuing from FIG. 16.
Figure 18:
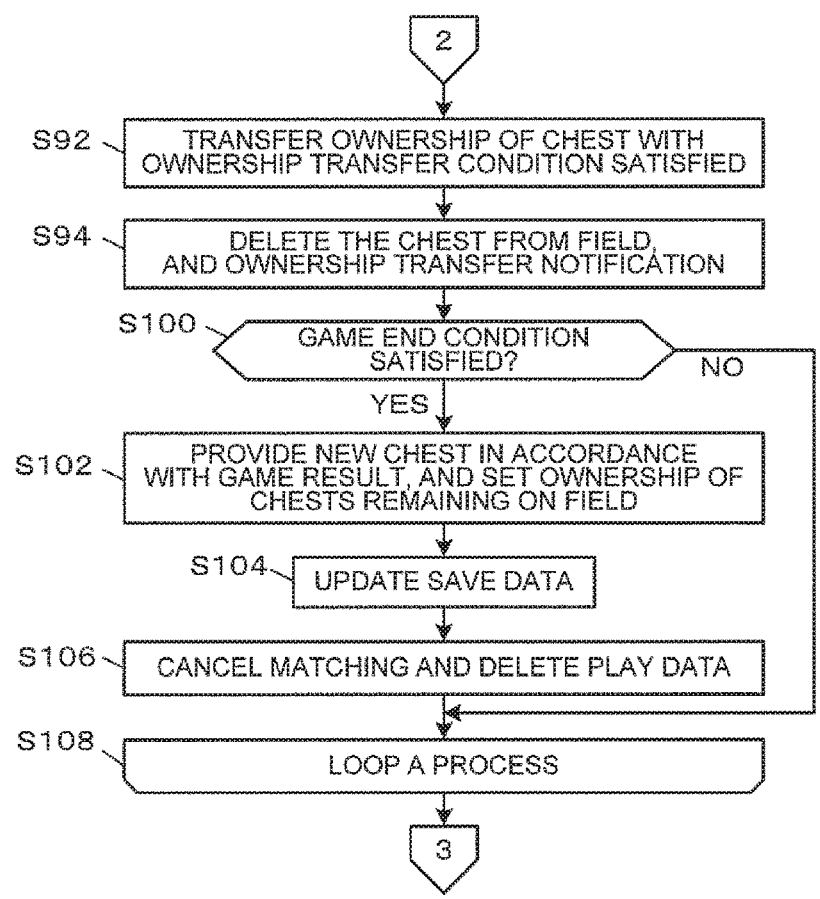
FIG. 18 is a flowchart continuing from FIG. 17.

FIG. 16 to FIG. 18 are flowcharts illustrating the flow of the processing in the server system 1100 according to the present embodiment. The user registration and login are assumed to have been completed by the player 2, before the processing starts.

As illustrated in FIG. 16, when a timer target setting operation is input on the user terminal 1500 (YES in step S6), the server system 1100 sets a predetermined number of chests 5, possessed by the player 2, within a settable range to be the timer target in accordance with the input operation (step S8). Specifically, a list of the chests 5 possessed by the player 2 is displayed on the user terminal 1500, to receive a timer target setting/canceling operation. Then, the timer target setting flag 623 (see FIG. 13) is changed. The activation timer remaining period 624 (see FIG. 13) of the chest 5 corresponding to the flag "1" and thus set as the timer target is automatically controlled so as to decrease at the speed that is the same as the elapse of time in the real world or faster.

Then, when the power-up fusion operation on the user terminal 1500 is detected (YES in step S10), the server system 1100 changes the activation condition and the activation control of the chest 5 serving as the target of the power-up fusion operation (step S12).

Specifically, the power-up fusion operation (for example, an operation of dragging and dropping a chest 5 serving as a material to a chest 5 serving as a target, or an operation of agreeing to pay the cost for the fusion) is received with the list of the chests 5 possessed by the player 2 displayed on the user terminal 1500.

The activation condition and the acquisition control are changed when the possible power-up fusion pattern 530 of the chest initial setting data 520 (see FIG. 10) of the chest 5 serving as the target includes a pattern including the material chest combination 534 involving the chest 5 serving as the material.

More specifically, the activation condition change pattern 540 (see FIG. 11) is searched for a pattern with the power-up fusion history requirement 546 being the only required requirement, and requiring the activation condition change requirement list 542, having the power-up fusion pattern ID 532 of the fusion to be executed and the power-up fusion pattern ID 532 of the fusion that has been executed, to be registered in the power-up fusion history 626 (see FIG. 13). When such a pattern is found, the activation timer remaining period 624 (see FIG. 13) of the chest 5 serving as the target is changed in accordance with the activation condition change detail 547 of the pattern.

The acquisition control change pattern 550 (see FIG. 12) is searched for a pattern with the power-up fusion history requirement 556 being the only required requirement, and requiring the acquisition control change requirement list 552, having the power-up fusion pattern ID 532 of the fusion to be executed and the power-up fusion pattern ID 532 of the fusion that has been executed, to be registered in the power-up fusion history 626 (see FIG. 13). When such a pattern is found, the reward rarity allocation list 625 (see FIG. 13) of the chest 5 serving as the target is changed in accordance with the acquisition control change detail 557 of the pattern.

Then, the power-up fusion history 626 (see FIG. 13) of the chest 5 serving as the target is updated, and the possessed chest management data 620 of the chest 5 serving as the material is deleted. If the deck building data 630 includes the chest 5 serving as the material, the chest is deleted from the built deck.

Then, the server system 1100 displays the activation condition change notification 40 when the activation condition has been changed (step S14, see FIG. 5), and displays the acquisition control change notification 42 (step S16; see FIG. 5) when the detail of the acquisition control has been changed.

Then, the server system 1100 extracts the chest 5 having the activation timer remaining period 624 decreased to "0", and thus having the activation condition satisfied so as to be capable of being activated, from the possessed chests 5. Thus, the server system 1100 issues a notification indicating that the chest 5 can be activated on the user terminal 1500 of the player 2 (step S20; see FIG. 6).

Specifically, when the chest 5 that can be activated is used for the deck building, the activation enabled notification 44 is displayed to be provided to the chest 5 displayed on the game field 20 or the deck display section 22. When the chest 5 that can be activated is not used for the deck building, the activation enabled message 45 is displayed.

Then, when an input of an acquiring operation for the chest 5 with the activation condition satisfied is detected (YES in step S30), the server system 1100 determines a reward in the chest 5 (the content of the chest) and provides the reward to the player who has input the acquisition operation (step S32).

Specifically, a corresponding one of the rewards in the rarity-specific reward candidate list 580 (see FIG. 9) is selected based on the order of the rarities registered in the reward rarity allocation list 625 in the possessed chest management data 620 (see FIG. 13) of the chest 5 for which the acquiring operation has been input. Then, the possessed character management data 614 or new possessed item management data 616 is added to the user management data 600 of the player 2 who has input the acquiring operation. Then, the possessed chest management data 620 on the chest 5 for which the acquiring operation has been performed is deleted. When the deck building data 630 includes the chest 5, the log of the chest 5 is deleted.

Then, when input of a play start operation is detected (YSE in step S40), the server system 1100 receives deck building operation input from the player 2 who has input the operation (step S42). Specifically, the possessed game object list screen W4 (see FIG. 4) is displayed, and the deck display section 22 is displayed based on the deck building data 630 (see FIG. 13). Then, the deck building data 630 (see FIG. 13) is updated in accordance with a drag and drop operation from the list to the deck display section 22, or from the deck display section 22 to the list.

Then, the server system 1100 registers the player in the matching waiting list 690 (step S44).

Then, the server system 1100 executes the matching process for the player registered in the matching waiting list 690 by selecting any of the registered users as an opponent (step S46). Note that the matching is not limited to an opponent online, and the action of the opponent may be automatically controlled based on the deck building data 630 of the opponent.

Referring back to FIG. 17, the server system 1100 executes a loop A process for each matching, that is, each player data 700 (step S50 to S108; FIG. 18).

In the loop A process, first, automatic control on the opponent side is executed (step S52). Specifically, the character 4z (see FIG. 4) is automatically deployed to be automatically controlled based on the deck building data 630 on the opponent. As a result, damage determination and reflection processes are performed when the character 4z is involved in a combat. Results of the processes are sequentially reflected on the game result data 730.

Then, the server system 1100 executes automatic control on the character 4 of the player 2 deployed on the game field 20 (step S54). As a result, the damage determination and reflection processes are performed when the character 4 of the player 2 is involved in a combat. Results of the processes are sequentially reflected on the game result data 730.

When an operation of deploying the character 4 in the deck on the game field 20 is detected (YES in step S60), the server system 1100 deploys this character on the game field 20, and starts the automatic control for the character (step S62).

When an operation of deploying the chest 5 in the deck on the game field 20 is detected, (YES in step S70), the chest 5 is deployed on the game field 20 (step S72).

Next, the server system 1100 changes the activation condition, for any of the chests 5 deployed on the game field 20 with required requirements in the activation condition change requirement list 542 (see FIG. 11) satisfied, in accordance with the corresponding activation condition change detail 547 (step S80).

In the present embodiment, the activation timer remaining period 624 (see FIG. 13) or the counting speed setting 717 (see FIG. 14) is changed. The activation condition change notification 40 (see FIG. 5) is displayed to the player 2 possessing the chest 5 on which the change has been made (step S82).

The server system 1100 changes the detail of the acquisition control of any of the chests 5 that have been deployed on the game field 20 with required requirements in the acquisition control change requirement list 552 (see FIG. 12) satisfied, in accordance with the corresponding acquisition control change detail 557 (step S84). In the present embodiment, the reward rarity allocation list 625 (see FIG. 13) is changed. Then, the acquisition control change notification 42 (see FIG. 5) is displayed to the player 2 possessing the chest 5 for which the change has been made (step S86).

Referring back to FIG. 18, the server system 1100 transfers the ownership of the chest 5 for which the ownership transfer condition has been satisfied (step S92), deletes the chest 5, the ownership of which has been transferred, from the game field 20, and displays the ownership transfer notification 46 (see FIG. 6) (step S94).

Specifically, the server system 1100 determines that the ownership transfer condition is satisfied when a character 4 makes an approach to or an attack on the chest 5 that has been deployed on the game field 20 and has had the activation condition satisfied. Note that the ownership transfer condition is not limited to this, and may be set as appropriate in accordance with the details of the game.

Then, the owner account 713 in the chest control data 710 (see FIG. 14) on the corresponding chest 5 is changed to the account of the player possessing the character 4 that has made the first contact or attack on the chest 5 after the activation condition has been satisfied. The corresponding possessed chest management data 620 (see FIG. 13) is transferred from the user management data 600 of the original owner of the chest 5 serving as the target of the ownership transfer to the user management data 600 of the new owner. Then, the chest 5 that is the target of the ownership transfer is deleted from the deck building data 630.

Then, the server system 1100 determines whether a game end condition has been satisfied (step S100). In the present embodiment, a result of this determination is YES when a predetermined play time has elapsed, or all of the bases 23 of one of the contenders are destroyed.

When the result is YES (YES in step S100), the server system 1100 provides a new chest 5 to the contender in accordance with the game result based on the game result data 730, and sets the ownership of the chest 5 remaining on the game field 20 (step S102). In this process, the ownership may be set to be transferred to the winner, or to the original owner regardless of the result of the match.

Then, the server system 1100 updates save data on the contender (step S104). Specifically, the possessed character management data 614 on the character 4 used in the deck building and in the gameplay is updated so that the ability parameter value increases.

Then, the matching is canceled and the play data 700 is discarded (step S106). Then, the loop A process is terminated (step S108).

The processing returns to step S6 when the loop A process has been executed on all the matchings, that is, for all the play data 700.

The present embodiment described above can provide an attractive game with a new attractiveness added to a system in which an object becomes acquirable when an activation condition is satisfied.

An overall quality of the gameplay can be improved with the user being capable of actively using the chest 5 as the medium object having the timer lock set as the activation condition as a unit in the game or of performing the power-up fusion, rather than waiting for the timer lock to be unlocked. The chest 5 used as the unit or used for the power-up fusion can have the activation condition changed to be more readily satisfied (condition can be relaxed) or have the configuration of the content (content object) changed. Thus, the game can have a higher attractiveness that has not been achievable by conventional techniques.

Second Embodiment

Next, a second embodiment is described. The present embodiment is implemented to be basically the same with the first embodiment, but is different from the first embodiment in that the user terminal 1500 mainly performs the processes for controlling the game progression. The difference from the first embodiment is mainly described below. Components that are the same as the counterparts in the first embodiment are denoted with the same reference numerals, and the description thereof will be omitted.

Figure 19:
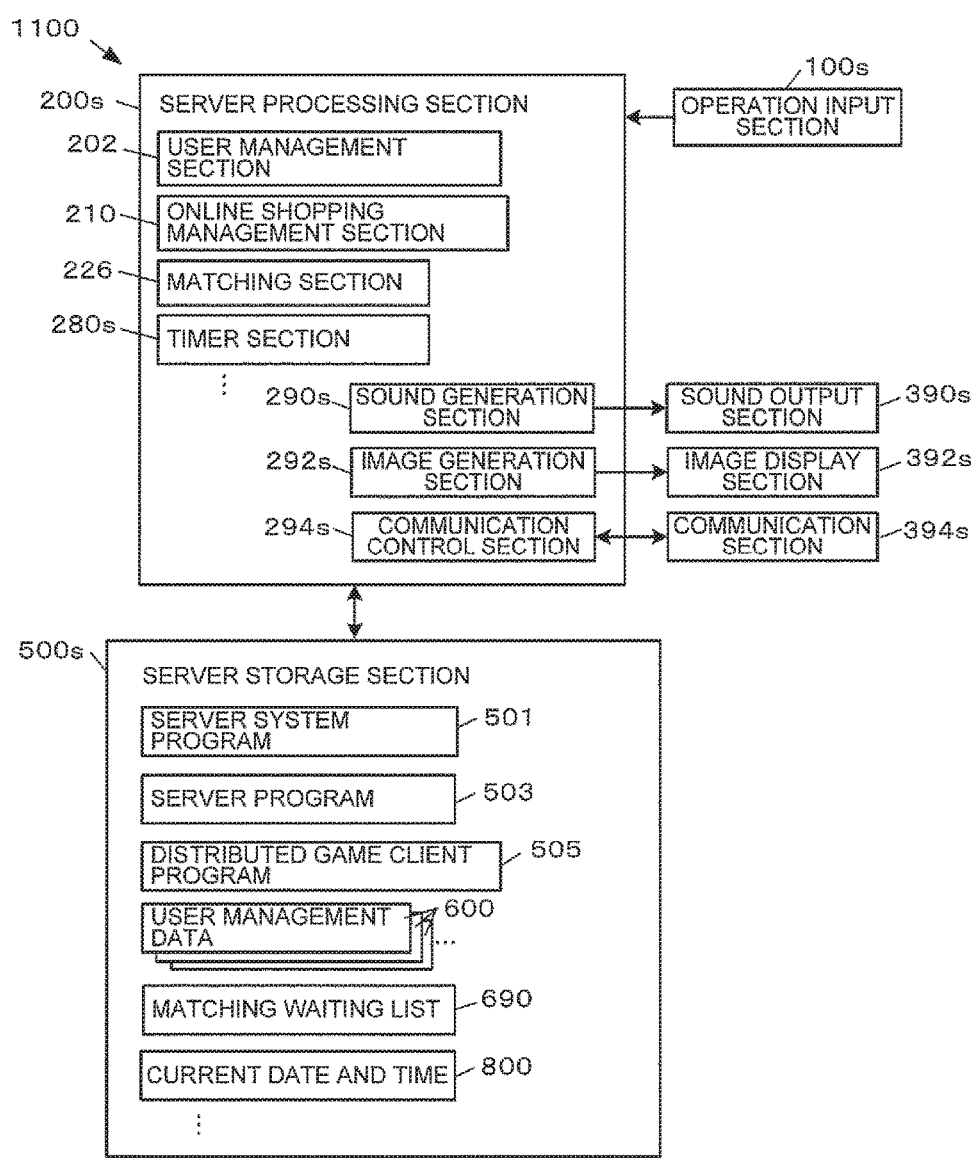
FIG. 19 is a functional block diagram illustrating an example of a functional configuration of a server system according to a second embodiment.

FIG. 19 is a functional block diagram illustrating an example of a functional configuration of the server system 1100 according to the present embodiment. The server system 1100 according to the present embodiment includes the matching section 226, with the rest of the game management section 220 omitted. Thus, the data required for the progress of the game is omitted in the server storage section 500s. Thus, the server system 1100 according to the present embodiment is mainly in charge of user registration, management of information on the user, and the matching, and provides resultant information in response to a request from the user terminal 1500.

Figure 20:
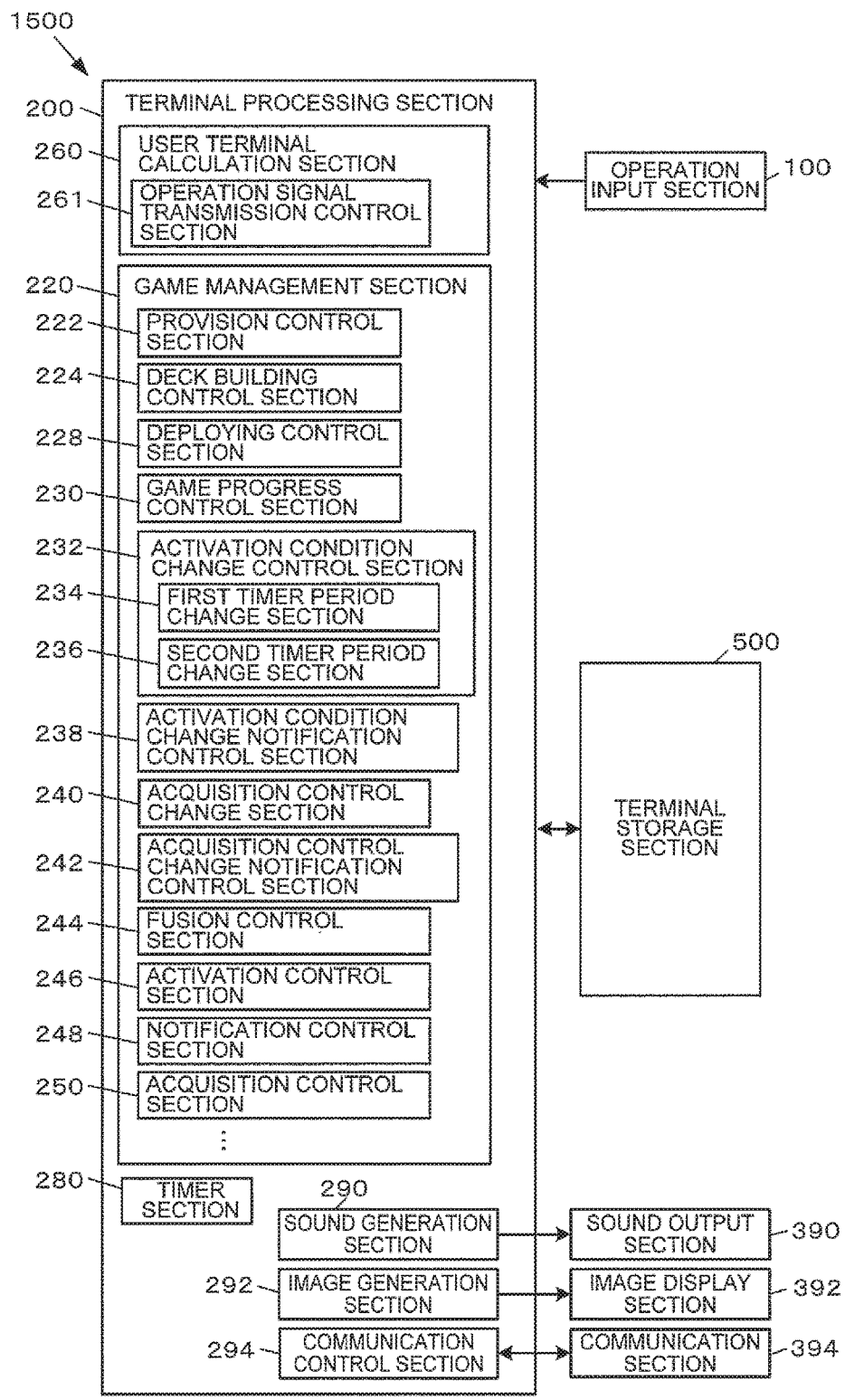
FIG. 20 is a functional block diagram illustrating an example of a functional configuration of a user terminal according to a second embodiment.

FIG. 20 is a functional block diagram illustrating an example of a functional configuration of the user terminal 1500 according to the present embodiment. The user terminal 1500 according to the present embodiment has the game screen display control section 262 omitted and includes the game management section 220. Thus, the user terminal 1500 according to the present embodiment executes the calculation process related to the game management, and generates a game space image.

Figure 21:
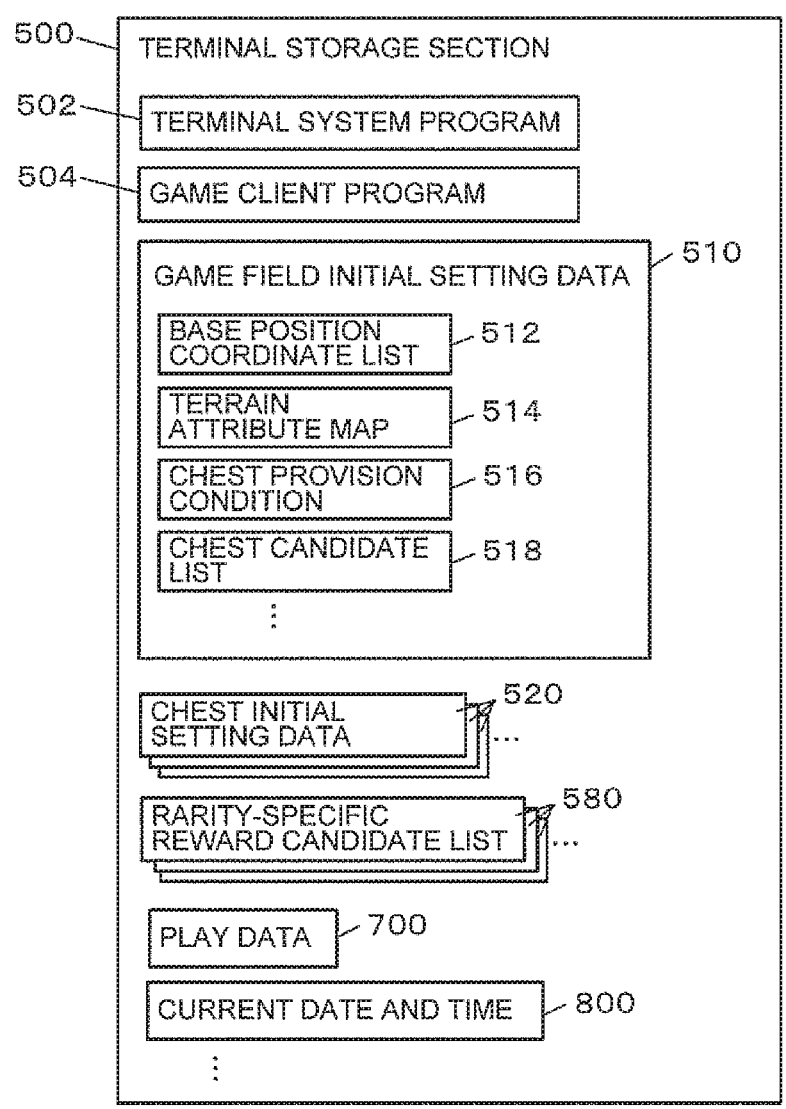
FIG. 21 is a view illustrating examples of programs and data stored in a terminal storage section according to the second embodiment.

FIG. 21 is a view illustrating examples of programs and data stored in the terminal storage section 500 of the user terminal 1500 according to the present embodiment.

When the game management section 220 is implemented in the user terminal 1500, the terminal storage section 500 according to the present embodiment stores the game field initial setting data 510, the chest initial setting data 520, the rarity-specific reward candidate list 580, the play data 700, and the current date and time 800. The game client program 504 according to the present embodiment implements the user terminal calculation section 260 and the game management section 220 in the terminal processing section 200.

The flow of the process according to present embodiment is basically the same as the flow of the process according to the first embodiment (see FIG. 16 to FIG. 18). The subject of the execution of each step related to the game management may be regarded as the server system 1100 or the user terminal 1500 as appropriate, based on the fact that the game management section 220 is implemented in the user terminal 1500. When a process requiring the user terminal 1500 to refer to or change the user management data 600 is executed, the server system 1100 is requested to provide, check, or make a change in required data as appropriate, or the server system 1100 is requested to execute the process.

The present embodiment provides an effect that is similar to that of the first embodiment. The user terminal 1500 may not be entirely in charge of all the functions of the game management section 220, and may be partially in charge of the functions.

[Modifications]

The embodiments to which the invention is applied have been described above. Note that the invention is not limited thereto. Various modifications may be appropriately made, such as adding other elements, omitting some of the elements, or changing some of the elements.

[First Modification]

For example, the present invention is not limited to the client-server computer system implemented in the embodiments described above. For example, a computer system in which a plurality of user terminals 1500 can establish a peer-to-peer (P2P) connection may be implemented.

Specifically, the configuration according to the second embodiment is employed in which the server system 1100 includes the matching section 226 with the rest of the game management section 220 omitted. The server system 1100 provides data as a matching result to the user terminals 1500 matched by the matching section 226, and then the user terminals establish the P2P connection. One of the user terminals 1500 is in charge of the functions of the game management section 220 (not including the matching section 226). Alternatively, a plurality of user terminals 1500 may cooperate to implement the functions.

[Second Modification]

In the above embodiments, the online game is described as an example. However, the present invention may be similarly applied to a game that is executed only within the user terminal 1500 in a stand-alone state, that is, a game executed in a game system including a single computer only. In such a configuration, basically, the functional configurations illustrated in FIGS. 8 and 15 or in FIGS. 19 and 20 may be regarded as being implemented solely by the user terminal 1500. This configuration involves no matching, and the player battles with a virtual player (what is known as a COM player) controlled by the computer.

[Third Modification]

The game according to the above embodiments is a battle game involving a battle between a human player and a computer. Alternatively, the game may be a battle game involving a battle between human players. The number of contenders in the battle game is not limited to two as in the above embodiments, and a battle royale may be implemented with three or more contenders.

Fourth Embodiment

In the above embodiment, the activation condition of the medium object is based on counting by the timer. Alternatively, other parameters may be used for the condition.

For example, the activation condition may include: position information measured by the position measurement module 1555 (see FIG. 2) of the user terminal 1500; and a changed amount related to the position information (for example, the amount of change in the position coordinates per day/hour/play (may be regarded as a moved distance) or a time required for the position change or the movement speed). Specifically, the activation condition may be an AND condition involving three parameters including: 1) the timer period; 2) the movement distance per day or time required for the movement; and 3) movement to the position satisfying a predetermined geographical condition. In such a configuration, the chest initial setting data 520 (see FIG. 10) is additionally provided with data defining standard values for the activation conditions 2) and 3). Any one of the activation conditions 2) and 3) or both may be employed with the activation condition 1) omitted. The position information may include a height or altitude as well as the latitude and longitude.

The change requirement for the activation condition may include the position information and the change in the position information (the movement distance and the movement speed). In such a configuration, the activation condition change requirement list 542 of the activation condition requirement pattern 540 (see FIG. 11) may be additionally be provided with the position information and the requirement for the amount of change related to the position information, as appropriate.

When the user terminal 1500 is equipped with an acceleration sensor, a result of detecting the acceleration may be used for the activation condition and the change requirement for the activation condition. Specifically, the number of times the change in the acceleration has been detected due to an action of a player such as shaking the user terminal 1500, walking, and jumping can be included in the activation condition and the change requirement for the activation condition.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A computer system that executes a game using an object possessed by a player, the computer system comprising:
    a processor; and
    a storage device storing a program,
    the processor is configured to execute the program to
        provide a medium object to the player, the medium object being associated with a content object in an acquisition suspended state and having at least a timer period set as a condition for transition from the acquisition suspended state to an acquisition enabled state, the timer period including counting speed;
        cause transition from the acquisition suspended state to the acquisition enabled state in which the content object associated with the medium object is acquirable when the timer period expires;
        deploy the medium object on a game field based on input of an operation by the player; and
        change the timer period of the medium object deployed on the game field, including to change the counting speed.

2. The computer system as defined in claim 1,
the timer period further including a remaining period,
the processor is further configured to change the timer period including to change the remaining period.

3. The computer system as defined in claim 1,
the processor is further configured to change, when deploying of the medium object on the game field or a game progression related to the game field is completed, the counting speed to be restored to a counting speed before the deploying on the game field.

4. The computer system as defined in claim 1,
the processor is further configured to change the timer period including to change the timer period so that the timer period is able to elapse quicker in a case where the medium object is deployed on the game field, than in a case where the medium object is not deployed.

5. The computer system as defined in claim 1,
the processor is further configured to change the timer period including to change the timer period in accordance with a deployed position of the medium object.

6. The computer system as defined in claim 1,
the processor is further configured to notify the player of the timer period.

7. The computer system as defined in claim 1,
the processor is further configured to change the timer period including to change the timer period when the medium object is deployed within an area of influence of an action performed by a character on the game field.

8. The computer system as defined in claim 7,
the timer period further including a remaining period,
the processor is further configured to change the timer period including to change the remaining period.

9. The computer system as defined in claim 7,
the processor executing the program for further notifying the player of the timer period.

10. The computer system as defined in claim 1,
the game being a battle game in which the medium object has no attacking ability,
the processor further configured to:
    build a deck as a combination of a predetermined number of objects to be in the game, selected from objects including a character object and the medium object possessed by the player, based on input of an operation by the player; and control a game progression involving a battle of the objects, in the deck, appearing in the game, the processor is further configured to deploy, when the medium object is in the deck, the medium object, in the deck, on the game field, based on input of an operation of the player.

11. A computer system that executes a game using an object possessed by a player, the computer system comprising:

a processor; and a storage device storing a program, the processor is configured to execute the program to provide a medium object to the player, the medium object being associated with a content object in an acquisition suspended state and having at least a timer period set as a condition for transition from the acquisition suspended state to an acquisition enabled state;

cause transition from the acquisition suspended state to the acquisition enabled state in which the content object associated with the medium object is acquirable when the timer period expires;

deploy the medium object on a game field based on input of an operation by the player; and change the timer period of the medium object deployed on the game field, the processor is further configured to acquire the content object which is associated with the medium object on a first come first served basis by a player who makes an acquisition operation while the game is in process, when the medium object deployed on the game field transitions to the acquisition enabled state.

12. The computer system as defined in claim 11, the timer period including a remaining period, the processor is further configured to change the timer period including to change the remaining period.

13. The computer system as defined in claim 11, the timer period including counting speed, the processor is further configured to change the timer period including to change the counting speed.

14. The computer system as defined in claim 13, the processor is further configured to change the timer period including to change, when deploying of the medium object on the game field or a game progression related to the game field is completed, the counting speed to be restored to a counting speed before the deploying on the game field.

15. The computer system as defined in claim 11, the processor is further configured to change the timer period including to change the timer period so that the timer period is able to elapse quicker in a case where the medium object is deployed on the game field, than in a case where the medium object is not deployed.

16. A computer system that executes a game using an object possessed by a player, the computer system comprising:

a processor; and a storage device storing a program, the processor is configured to execute the program to provide a medium object to the player, the medium object being associated with a content object in an acquisition suspended state and having at least a timer period set as a condition for transition from the acquisition suspended state to an acquisition enabled state;

cause transition from the acquisition suspended state to the acquisition enabled state in which the content object associated with the medium object is acquirable when the timer period expires, wherein in the acquisition enabled state the content object associated with the medium object is acquirable in response to an acquiring operation performed by the player on the medium object, and in the acquisition suspended state the content object associated with the medium object is not acquirable by the player;

deploy the medium object on a game field based on input of an operation by the player; and change the timer period of the medium object deployed on the game field.

17. The computer system as defined in claim 16, the timer period including counting speed, the processor is further configured to change the timer period including to change the counting speed.

18. The computer system as defined in claim 16, the timer period including a remaining period, the processor is further configured to change the timer period including to change the remaining period.

19. The computer system as defined in claim 16, the processor is further configured to change the timer period including to change, when deploying of the medium object on the game field or a game progression related to the game field is completed, the counting speed to be restored to a counting speed before the deploying on the game field.

20. The computer system as defined in claim 16, the processor is further configured to change the timer period including to change the timer period so that the timer period is able to elapse quicker in a case where the medium object is deployed on the game field, than in a case where the medium object is not deployed.

* * * * *